(12) United States Patent
Liu et al.

(10) Patent No.: US 11,362,527 B2
(45) Date of Patent: Jun. 14, 2022

(54) FAST CHARGING METHOD, TERMINAL, CHARGER, AND SYSTEM WITH OPEN LOOP CONTROL

(71) Applicant: HUAWEI TECHNOLOGIES CO., LTD., Guangdong (CN)

(72) Inventors: Ce Liu, Shenzhen (CN); Xujun Liu, Shenzhen (CN); Yanding Liu, Shenzhen (CN); Yunfeng Liu, Shanghai (CN); Jinbo Ma, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 162 days.

(21) Appl. No.: 16/197,471

(22) Filed: Nov. 21, 2018

(65) Prior Publication Data

US 2019/0089170 A1 Mar. 21, 2019

Related U.S. Application Data

(63) Continuation of application No. PCT/CN2017/085142, filed on May 19, 2017.

(30) Foreign Application Priority Data

May 24, 2016 (CN) .......................... 201610350094.4

(51) Int. Cl.
*H02J 7/00* (2006.01)
*H01M 10/44* (2006.01)

(52) U.S. Cl.
CPC .......... *H02J 7/0027* (2013.01); *H01M 10/44* (2013.01); *H02J 7/007* (2013.01); *H02J 7/0045* (2013.01);
(Continued)

(58) Field of Classification Search
CPC ...... H02J 7/0027; H02J 7/0077; H02J 7/0045; H02J 7/007; H02J 7/00712; H02J 7/008; H02J 7/045; H02J 7/06; H01M 10/44
(Continued)

(56) References Cited

U.S. PATENT DOCUMENTS 4,128,868 A * 12/1978 Gamble .............. H02M 3/3376
　　　　　　　　　　　　　　　　　　　　　363/26
4,143,282 A * 3/1979 Berard, Jr. ................ H02J 7/35
　　　　　　　　　　　　　　　　　　　　　307/149

(Continued)

FOREIGN PATENT DOCUMENTS

CN　　101647182 B　　2/2010
CN　　102468748 A　*　5/2012
(Continued)

OTHER PUBLICATIONS

"What are the advantages and disadvantages of an open-loop control system?" Pragya Sood, Specialties.bayt.com, Published Online Jan. 8, 2016, Accessed Online Aug. 9, 2020, https://specialties.bayt.eom/en/specialties/q/249473/what-are-the-advantages-and-disadvantages-of-an-open-loop-control-system/.*
(Continued)

*Primary Examiner* — John T Trischler
(74) *Attorney, Agent, or Firm* — Fish & Richardson P.C.

(57) ABSTRACT

A charging method, a terminal, a charger, and a system, includes: obtaining, by a terminal, a charging mode supported by a charger connected to the terminal; when the charging mode supported by the charger includes an open-loop fast charging mode, detecting, by the terminal, whether both the terminal and the charger are in an open loop state; when both the terminal and the charger are in the open loop state, sending, by the terminal, an open-loop fast charging instruction to the charger; and receiving, by the terminal, a voltage and a current that are transmitted by the charger
(Continued)

according to the open-loop fast charging instruction, and performing charging in the open-loop fast charging mode. When determining that the charger supports charging in the open-loop fast charging mode, the terminal is adjusted to the open loop state to perform charging, so as to shorten a charging time and improve user experience.

20 Claims, 8 Drawing Sheets

(52) U.S. Cl.
CPC .............. *H02J 7/0077* (2013.01); *H02J 7/00* (2013.01); *H02J 7/00034* (2020.01); *H02J 2207/20* (2020.01)

(58) Field of Classification Search
USPC ........................................................ 320/114
See application file for complete search history.

(56) References Cited

U.S. PATENT DOCUMENTS

| | | | | |
|---|---|---|---|---|
| 4,165,719 A * | 8/1979 | Asano | F02D 41/1474 | 123/688 |
| 5,225,712 A * | 7/1993 | Erdman | F03D 7/042 | 290/44 |
| 5,357,418 A * | 10/1994 | Clavel | H02M 3/33576 | 323/266 |
| 5,416,387 A * | 5/1995 | Cuk | H05B 41/28 | 315/209 R |
| 5,796,238 A * | 8/1998 | Hiratsuka | G01R 31/3648 | 320/112 |
| 5,977,652 A * | 11/1999 | Frey | H02J 7/1423 | 307/10.1 |
| 6,087,810 A | 7/2000 | Yoshida | | |
| 6,195,276 B1 * | 2/2001 | Sebille | H02J 7/1492 | 363/127 |
| 6,215,288 B1 * | 4/2001 | Ramsey | H02M 3/1588 | 323/224 |
| 6,268,715 B1 * | 7/2001 | Oglesbee | H01M 10/44 | 320/156 |
| 6,286,609 B1 * | 9/2001 | Carrier | B25F 5/02 | 173/1 |
| 6,316,919 B1 * | 11/2001 | Sumimoto | H02P 9/305 | 322/28 |
| 6,343,021 B1 * | 1/2002 | Williamson | H02M 1/10 | 363/163 |
| 6,415,186 B1 * | 7/2002 | Chim | A61N 1/3787 | 607/57 |
| 6,946,817 B2 * | 9/2005 | Fischer | H02J 7/0027 | 320/132 |
| 7,135,836 B2 * | 11/2006 | Kutkut | H02J 7/02 | 320/116 |
| 7,362,084 B2 * | 4/2008 | Tran | G11C 5/145 | 307/43 |
| 7,474,079 B2 * | 1/2009 | Hashimoto | H02J 7/02 | 320/138 |
| 7,528,590 B2 * | 5/2009 | Wei | H02M 3/156 | 323/282 |
| 7,558,092 B2 * | 7/2009 | Nakahori | H02M 3/285 | 363/17 |
| 7,598,709 B2 * | 10/2009 | Guang | H02J 7/00712 | 320/135 |
| 7,626,362 B2 * | 12/2009 | Guang | H02J 7/0086 | 320/135 |
| 7,663,342 B2 * | 2/2010 | Kimball | H02J 7/34 | 320/132 |
| 7,683,574 B2 * | 3/2010 | Guang | H02J 7/00712 | 320/121 |
| 7,728,563 B2 * | 6/2010 | Van Tran | H02M 1/36 | 323/222 |
| 7,737,765 B2 * | 6/2010 | Tran | H02M 1/44 | 327/536 |
| 7,768,242 B2 * | 8/2010 | Wei | H02M 3/156 | 323/222 |
| 7,786,712 B2 * | 8/2010 | Williams | H02M 3/07 | 323/266 |
| 7,843,171 B2 * | 11/2010 | Schroeder | H02J 2207/40 | 320/138 |
| 7,868,604 B2 * | 1/2011 | Tran | H02M 1/44 | 323/317 |
| 7,873,854 B2 * | 1/2011 | Westwick | H03K 17/22 | 713/340 |
| 7,873,856 B2 * | 1/2011 | Westwick | H03K 17/223 | 713/340 |
| 7,898,220 B2 * | 3/2011 | Guang | H02J 7/00712 | 320/135 |
| 7,908,500 B2 * | 3/2011 | Westwick | G06F 1/3243 | 713/323 |
| 7,982,434 B2 * | 7/2011 | Kimball | H02J 7/34 | 320/132 |
| 8,004,248 B2 * | 8/2011 | Mayega | H02J 7/0072 | 320/145 |
| 8,027,175 B2 * | 9/2011 | Liu | H02M 3/33515 | 363/16 |
| 8,067,931 B2 * | 11/2011 | Tran | H02M 3/07 | 323/315 |
| 8,169,185 B2 * | 5/2012 | Partovi | H01F 27/362 | 320/108 |
| 8,269,467 B2 * | 9/2012 | Li | H02J 7/0091 | 320/153 |
| 8,271,089 B2 * | 9/2012 | Dinsmoor | A61N 1/3787 | 607/33 |
| 8,278,871 B2 * | 10/2012 | Kallmyer | A61N 1/3787 | 320/108 |
| 8,282,044 B2 * | 10/2012 | Sperandei | B64G 1/283 | 244/165 |
| 8,350,540 B2 * | 1/2013 | Cuk | H02M 3/005 | 323/232 |
| 8,497,667 B2 * | 7/2013 | Van Tran | H02M 1/36 | 323/281 |
| 8,503,193 B2 * | 8/2013 | Kippley | H02M 3/33507 | 363/17 |
| 8,519,667 B2 * | 8/2013 | Tsai | H02J 7/007192 | 320/108 |
| 8,629,654 B2 * | 1/2014 | Partovi | H02J 7/0044 | 320/108 |
| 8,669,736 B2 * | 3/2014 | Seethaler | G06F 1/263 | 320/107 |
| 8,669,744 B1 * | 3/2014 | Vinciarelli | H02M 3/1582 | 323/235 |
| 8,674,662 B2 * | 3/2014 | Chueh | H02J 7/0071 | 320/150 |
| 8,674,749 B2 * | 3/2014 | Tran | H02M 3/07 | 327/536 |
| 8,880,253 B2 * | 11/2014 | Li | B60W 10/26 | 701/22 |
| 8,947,047 B2 * | 2/2015 | Partovi | H02J 7/0044 | 320/108 |
| 9,153,991 B2 | 10/2015 | Chaturvedi | H01M 10/443 | |
| 9,168,881 B2 | 10/2015 | Garofalo | B60L 58/12 | |
| 9,276,437 B2 | 3/2016 | Partovi | H02J 50/80 | |
| 9,368,991 B2 * | 6/2016 | Qahouq | H02J 7/0018 | |
| 9,557,791 B2 * | 1/2017 | Hsieh | G06F 1/266 | |
| 9,601,943 B2 | 3/2017 | Partovi | H02J 50/12 | |
| 9,685,852 B2 | 6/2017 | Somani | H02M 1/36 | |
| 9,716,294 B2 | 7/2017 | Li | H02J 7/00047 | |
| 9,728,989 B2 | 8/2017 | Kim | H02J 7/025 | |
| 9,738,166 B2 | 8/2017 | Doffin | H02J 50/80 | |
| 9,859,740 B2 | 1/2018 | Chi | H02J 7/00047 | |
| 9,923,396 B2 | 3/2018 | Lei | H02J 7/00 | |
| 10,025,328 B2 | 7/2018 | Zikes | G05D 23/1905 | |
| 10,044,229 B2 * | 8/2018 | Partovi | H02J 50/005 | |
| 10,097,022 B2 | 10/2018 | Li | H02J 7/00036 | |
| 10,135,263 B2 | 11/2018 | Jung | H02J 7/0071 | |
| 10,243,444 B2 | 3/2019 | Somani | H02M 7/539 | |
| 10,262,824 B2 | 4/2019 | Matsuo | H01F 7/1844 | |
| 10,312,746 B2 | 6/2019 | Chu | H02J 7/025 | |

(56) References Cited

U.S. PATENT DOCUMENTS

| | | | | |
|---|---|---|---|---|
| 10,326,291 B2* | 6/2019 | Zhang | | H02J 7/0036 |
| 10,432,009 B2* | 10/2019 | Pan | | H02J 7/04 |
| 10,461,550 B2* | 10/2019 | Zeng | | H02J 7/0047 |
| 10,686,378 B2* | 6/2020 | Dai | | H02M 3/33507 |
| 10,693,384 B1* | 6/2020 | Mondal | | H02M 3/33592 |
| 10,707,753 B2* | 7/2020 | Koski | | H02M 3/07 |
| 10,720,849 B2* | 7/2020 | Mao | | H02J 5/005 |
| 10,734,830 B2* | 8/2020 | Liu | | H02J 7/00 |
| 10,793,006 B2* | 10/2020 | Kerscher | | B60M 1/36 |
| 10,855,193 B2* | 12/2020 | Maruyama | | H02J 7/0024 |
| 2002/0125854 A1* | 9/2002 | Williamson | | H02M 1/10 |
| | | | | 318/727 |
| 2003/0054703 A1* | 3/2003 | Fischer | | H02J 7/0027 |
| | | | | 439/894 |
| 2003/0206021 A1* | 11/2003 | Laletin | | G01R 31/386 |
| | | | | 324/426 |
| 2004/0189251 A1* | 9/2004 | Kutkut | | H02J 7/02 |
| | | | | 320/128 |
| 2006/0202668 A1* | 9/2006 | Tran | | G11C 5/145 |
| | | | | 323/215 |
| 2006/0202741 A1* | 9/2006 | Tran | | H02M 1/44 |
| | | | | 327/536 |
| 2007/0075682 A1* | 4/2007 | Guang | | H02J 7/00712 |
| | | | | 320/128 |
| 2007/0103001 A1* | 5/2007 | Chiozzi | | H03K 17/04106 |
| | | | | 307/10.1 |
| 2007/0201250 A1* | 8/2007 | Nakahori | | H02M 3/285 |
| | | | | 363/17 |
| 2007/0229028 A1 | 10/2007 | Hashimoto | | |
| 2007/0278994 A1* | 12/2007 | Mayega | | H02J 7/0072 |
| | | | | 320/107 |
| 2008/0012533 A1* | 1/2008 | Guang | | H02J 7/0077 |
| | | | | 320/134 |
| 2008/0024090 A1* | 1/2008 | Guang | | H02J 7/0086 |
| | | | | 320/148 |
| 2008/0111532 A1* | 5/2008 | Tran | | H02M 3/07 |
| | | | | 323/313 |
| 2008/0157733 A1* | 7/2008 | Williams | | H02M 3/07 |
| | | | | 323/266 |
| 2008/0179961 A1* | 7/2008 | Kimball | | H02J 1/102 |
| | | | | 307/82 |
| 2009/0033293 A1* | 2/2009 | Xing | | H02J 7/02 |
| | | | | 320/164 |
| 2009/0079386 A1* | 3/2009 | Gallagher | | H01F 38/14 |
| | | | | 320/108 |
| 2009/0085535 A1* | 4/2009 | Wei | | H02M 3/156 |
| | | | | 323/272 |
| 2009/0085619 A1* | 4/2009 | Westwick | | H03K 17/22 |
| | | | | 327/143 |
| 2009/0086517 A1* | 4/2009 | Wei | | H02M 3/156 |
| | | | | 363/50 |
| 2009/0089599 A1* | 4/2009 | Westwick | | G06F 1/3243 |
| | | | | 713/323 |
| 2009/0089605 A1* | 4/2009 | Westwick | | H03K 17/223 |
| | | | | 713/340 |
| 2009/0096413 A1* | 4/2009 | Partovi | | H02J 7/045 |
| | | | | 320/108 |
| 2009/0160411 A1* | 6/2009 | Tran | | G11C 5/145 |
| | | | | 323/268 |
| 2009/0167239 A1* | 7/2009 | Yano | | H01M 8/04552 |
| | | | | 320/101 |
| 2009/0184687 A1* | 7/2009 | Schroeder | | H02J 7/0071 |
| | | | | 320/162 |
| 2009/0206797 A1* | 8/2009 | Chueh | | H02J 7/0071 |
| | | | | 320/150 |
| 2009/0289605 A1* | 11/2009 | Takahashi | | H02J 7/00 |
| | | | | 320/163 |
| 2010/0033137 A1* | 2/2010 | Guang | | H02J 7/0077 |
| | | | | 320/148 |
| 2010/0157638 A1* | 6/2010 | Naiknaware | | H02M 3/33546 |
| | | | | 363/131 |
| 2010/0188138 A1* | 7/2010 | Tran | | H02M 3/07 |
| | | | | 327/536 |
| 2010/0213895 A1* | 8/2010 | Keating | | H02J 7/0013 |
| | | | | 320/108 |
| 2010/0256709 A1* | 10/2010 | Kallmyer | | A61N 1/3787 |
| | | | | 607/61 |
| 2010/0256710 A1* | 10/2010 | Dinsmoor | | H02J 7/00034 |
| | | | | 607/61 |
| 2010/0283326 A1* | 11/2010 | Kimball | | H02J 1/102 |
| | | | | 307/82 |
| 2011/0006162 A1* | 1/2011 | Sperandei | | B64G 1/283 |
| | | | | 244/165 |
| 2011/0057640 A1* | 3/2011 | Cuk | | H02M 3/005 |
| | | | | 323/311 |
| 2011/0068735 A1* | 3/2011 | Nicholson | | H02J 7/0069 |
| | | | | 320/107 |
| 2011/0101696 A1* | 5/2011 | Holle | | H02J 3/28 |
| | | | | 290/53 |
| 2011/0109274 A1* | 5/2011 | Minamiura | | H02J 7/0072 |
| | | | | 320/134 |
| 2011/0121799 A1* | 5/2011 | Tran | | H02M 1/36 |
| | | | | 323/268 |
| 2011/0148353 A1* | 6/2011 | King | | H02J 7/0027 |
| | | | | 320/109 |
| 2011/0248670 A1* | 10/2011 | Yamazaki | | H01M 2/0212 |
| | | | | 320/107 |
| 2012/0026771 A1* | 2/2012 | Imura | | B60L 3/0015 |
| | | | | 363/178 |
| 2012/0044722 A1* | 2/2012 | Cuk | | H02M 3/337 |
| | | | | 363/21.03 |
| 2012/0068636 A1* | 3/2012 | Iwashita | | H02P 6/085 |
| | | | | 318/376 |
| 2012/0074923 A1* | 3/2012 | Tran | | G11C 5/145 |
| | | | | 323/315 |
| 2012/0098495 A1* | 4/2012 | Yang | | H01M 10/44 |
| | | | | 320/115 |
| 2012/0176096 A1* | 7/2012 | Mumelter | | H02J 7/0029 |
| | | | | 320/134 |
| 2012/0256585 A1* | 10/2012 | Partovi | | H02J 7/025 |
| | | | | 320/108 |
| 2012/0286724 A1* | 11/2012 | Tsai | | H02J 50/12 |
| | | | | 320/108 |
| 2012/0299532 A1 | 11/2012 | Seethaler et al. | | |
| 2013/0006454 A1* | 1/2013 | Li | | B60W 20/13 |
| | | | | 701/22 |
| 2013/0113416 A1* | 5/2013 | Ishibashi | | H02J 7/00 |
| | | | | 320/107 |
| 2013/0175983 A1* | 7/2013 | Partovi | | H01F 5/003 |
| | | | | 320/108 |
| 2013/0221905 A1* | 8/2013 | Holloway | | H02J 7/007 |
| | | | | 320/107 |
| 2013/0278223 A1* | 10/2013 | Li | | H02J 7/00047 |
| | | | | 320/136 |
| 2013/0307473 A1* | 11/2013 | Han | | H02J 50/10 |
| | | | | 320/108 |
| 2013/0313897 A1* | 11/2013 | Garofalo | | B60L 58/12 |
| | | | | 307/10.1 |
| 2014/0002031 A1* | 1/2014 | Chaturvedi | | H02J 7/007 |
| | | | | 320/152 |
| 2014/0009120 A1* | 1/2014 | Kim | | H02J 7/0068 |
| | | | | 320/138 |
| 2014/0074185 A1* | 3/2014 | Fell | | H02J 50/80 |
| | | | | 607/61 |
| 2014/0125284 A1* | 5/2014 | Qahouq | | H02J 7/00 |
| | | | | 320/118 |
| 2014/0145516 A1* | 5/2014 | Hirosawa | | H02J 7/00712 |
| | | | | 307/104 |
| 2014/0159673 A1* | 6/2014 | Han | | H02J 50/80 |
| | | | | 320/137 |
| 2015/0048788 A1* | 2/2015 | Doffin | | H02J 50/12 |
| | | | | 320/108 |
| 2015/0145475 A1* | 5/2015 | Partovi | | H02J 7/0044 |
| | | | | 320/108 |
| 2015/0180244 A1* | 6/2015 | Jung | | H02J 7/0071 |
| | | | | 320/107 |

(56) References Cited

U.S. PATENT DOCUMENTS

| | | | |
|---|---|---|---|
| 2015/0236757 A1* | 8/2015 | Lee | H02J 50/12 320/108 |
| 2015/0270740 A1* | 9/2015 | Lee | H02J 50/40 320/108 |
| 2015/0372530 A1* | 12/2015 | Chu | H02J 7/025 320/108 |
| 2016/0064978 A1 | 3/2016 | Lei et al. | |
| 2016/0105038 A1* | 4/2016 | Chi | H02J 7/00036 320/107 |
| 2016/0164324 A1* | 6/2016 | Hsu | H02J 7/045 320/114 |
| 2016/0181860 A1* | 6/2016 | Partovi | H02J 50/12 320/108 |
| 2016/0301238 A1* | 10/2016 | Khoshvenis | H02J 50/80 |
| 2016/0334812 A1* | 11/2016 | Zikes | G05D 23/1905 |
| 2016/0339857 A1* | 11/2016 | Crain | H02M 3/04 |
| 2016/0339997 A1* | 11/2016 | Crain | B60L 15/007 |
| 2016/0359419 A1* | 12/2016 | Lin | H02M 3/33592 |
| 2017/0005494 A1* | 1/2017 | Li | G06F 1/263 |
| 2017/0005564 A1* | 1/2017 | Somani | H02J 3/32 |
| 2017/0019022 A1* | 1/2017 | Anderson | H02M 3/156 |
| 2017/0040805 A1* | 2/2017 | Huang | H02J 7/04 |
| 2017/0040810 A1* | 2/2017 | Hu | H02J 7/04 |
| 2017/0040814 A1* | 2/2017 | Hu | H02J 7/00714 |
| 2017/0040821 A1 | 2/2017 | Li et al. | |
| 2017/0090537 A1* | 3/2017 | Elad | H02J 7/00034 |
| 2017/0093189 A1* | 3/2017 | Zeng | H02J 7/007 |
| 2017/0098942 A1* | 4/2017 | Zeng | H04M 19/08 |
| 2017/0126021 A1* | 5/2017 | Desrosiers | H02J 7/00304 |
| 2017/0126023 A1* | 5/2017 | Jung | H02J 7/0071 |
| 2017/0149252 A1* | 5/2017 | Zhang | G06F 1/206 |
| 2017/0159306 A1* | 6/2017 | Maurus | E04H 1/1205 |
| 2017/0179726 A1* | 6/2017 | Garrity | H02J 3/38 |
| 2017/0194809 A1* | 7/2017 | Partovi | H01F 38/14 |
| 2017/0232863 A1* | 8/2017 | Friedrich | B60L 58/22 320/134 |
| 2017/0256973 A1* | 9/2017 | Kim | H02J 7/0068 |
| 2017/0358980 A1* | 12/2017 | Somani | H02J 9/005 |
| 2018/0026550 A1* | 1/2018 | Dent | H02J 3/381 363/56.01 |
| 2018/0062413 A1* | 3/2018 | Zhang | H01F 27/425 |
| 2018/0086419 A1* | 3/2018 | Crain | H02M 7/219 |
| 2018/0132732 A1* | 5/2018 | Lin | F04B 49/08 |
| 2018/0159353 A1* | 6/2018 | Pan | H02J 7/045 |
| 2018/0198290 A1* | 7/2018 | Rohera | H02J 7/345 |
| 2018/0218862 A1* | 8/2018 | Matsuo | H01F 7/1844 |
| 2018/0222325 A1* | 8/2018 | Kerscher | B60L 5/24 |
| 2018/0226930 A1* | 8/2018 | Schober | H03K 19/00384 |
| 2018/0241230 A1* | 8/2018 | Ikeda | B60L 58/20 |
| 2018/0248233 A1* | 8/2018 | Schade | H01M 10/482 |
| 2018/0262037 A1* | 9/2018 | Meskens | A61N 1/3787 |
| 2019/0036354 A1* | 1/2019 | Liu | G01R 31/3648 |
| 2019/0050037 A1* | 2/2019 | Wang | G06F 1/266 |
| 2019/0089174 A1* | 3/2019 | Zeng | H02J 7/0047 |
| 2019/0089244 A1* | 3/2019 | Koski | H02M 3/073 |
| 2019/0097431 A1* | 3/2019 | Jung | H02J 7/0071 |
| 2019/0109483 A1* | 4/2019 | Huo | H02J 7/0071 |
| 2019/0185110 A1* | 6/2019 | Hosaluk | B60L 15/007 |
| 2019/0190284 A1* | 6/2019 | Pinto | H02J 7/0029 |
| 2019/0222039 A1* | 7/2019 | Liu | H01M 10/46 |
| 2019/0222041 A1* | 7/2019 | Liu | H02J 7/0068 |
| 2020/0070672 A1* | 3/2020 | Vahedi | H02J 7/35 |
| 2020/0076222 A1* | 3/2020 | Yang | H02J 50/12 |
| 2020/0076249 A1* | 3/2020 | Mao | H04B 5/0075 |
| 2020/0076304 A1* | 3/2020 | Oyama | B60L 55/00 |
| 2020/0091830 A1* | 3/2020 | Maruyama | B60L 1/00 |
| 2020/0161907 A1* | 5/2020 | Yang | H02J 7/025 |
| 2020/0185931 A1* | 6/2020 | Stuart | H02J 7/0029 |
| 2020/0244071 A1* | 7/2020 | Smith | H02J 3/383 |
| 2021/0408818 A1* | 12/2021 | Yang | H01M 10/44 |

FOREIGN PATENT DOCUMENTS

| | | |
|---|---|---|
| CN | 104092274 A | 10/2014 |
| CN | 104124483 A | 10/2014 |
| CN | 104393627 A | 3/2015 |
| CN | 104617643 A | 5/2015 |
| CN | 104967199 A | 10/2015 |
| EP | 2887492 A2 | 6/2015 |
| WO | 2009017783 A1 | 2/2009 |
| WO | 2014194810 A1 | 12/2014 |

OTHER PUBLICATIONS

David Reusch et al, Three Level Buck Converter with Control and Soft Startup. 2009 IEEE, 5 pages.

International Search Report and Written Opinion issued in International Application No. PCT/CN2017/085142 dated Aug. 2, 2017, 18 pages.

Extended European Search Report issued in European Application No. 17802103.6 dated Apr. 12, 2019, 9 pages.

Chinese Search Report issued in Chinese Application No. 201610350094.4 dated Dec. 28, 2017, 12 pages (English machine translation).

* cited by examiner

FAST CHARGING METHOD, TERMINAL, CHARGER, AND SYSTEM WITH OPEN LOOP CONTROL

CROSS-REFERENCE TO RELATED APPLICATIONS

This application is a continuation of International Application No. PCT/CN2017/085142, filed on May 19, 2017, which claims priority to Chinese Patent Application No. 201610350094.4, filed on May 24, 2016. The disclosures of the aforementioned applications are hereby incorporated by reference in their entireties.

TECHNICAL FIELD

The present application relates to charging technologies, and in particular, to a charging method, a terminal, a charger, and a system.

BACKGROUND

With the development of science and technology, a function of a terminal becomes more powerful, and a user can work and have entertainment by using the terminal, so that the terminal has become an indispensable part of people's daily life. However, a battery life of the terminal is limited, and the user needs to continuously charge the terminal.

However, with a larger capacity and higher density of a battery equipped in the terminal, a charging time of the terminal becomes longer, so that normal use of the terminal by the user is severely affected and user experience is relatively poor.

SUMMARY

Embodiments of the present application provide a charging method, a terminal, a charger, and a system, so as to fast charge the terminal, thereby improving user experience.

A first aspect of the present application provides a charging method, where the method includes: obtaining, by a terminal, a charging mode supported by a charger connected to the terminal; when the charging mode supported by the charger includes an open-loop fast charging mode, detecting, by the terminal, whether both the terminal and the charger are in an open loop state; when both the terminal and the charger are in the open loop state, sending, by the terminal, an open-loop fast charging instruction to the charger; and receiving, by the terminal, a voltage and a current that are transmitted by the charger according to the open-loop fast charging instruction, and performing charging in the open-loop fast charging mode.

It may be understood that if the charger is not in the open loop state, the terminal may send a status adjustment instruction to the charger, so that the charger adjusts a charging state to the open loop state according to the status adjustment instruction. It should be noted that the charger can support the open-loop fast charging mode only when the charger is in the open loop state.

It should be noted that the terminal may further detect whether a battery status reaches a preset status, for example, a state of charge and a health state.

It may be understood that the open-loop fast charging instruction may include a plurality of parameter combinations, and is specifically as follows:

Optionally, the open-loop fast charging instruction includes a battery voltage value of the terminal and a target voltage value of the terminal, and the open-loop fast charging instruction is used to instruct the charger to output a voltage of the target voltage value and output a current according to the battery voltage value; and
the performing, by the terminal, charging in the open-loop fast charging mode includes:
converting, by the terminal, the received voltage into a charging voltage having a voltage value being 1/K times the voltage value of the received voltage, and converting the received current into a charging current having a current value being K times a current value of the received current, where a conversion coefficient K is a constant value, and K is any real number greater than 1; and
charging, by the terminal, a battery according to the charging voltage and the charging current.

Optionally, the open-loop fast charging instruction includes a target voltage value and a target current value, and the open-loop fast charging instruction is used to instruct the charger to output a voltage of the target voltage value and a current of the target current value; and
the performing, by the terminal, charging in the open-loop fast charging mode includes:
converting, by the terminal, the received voltage into a charging voltage having a voltage value being 1/K times the voltage value of the received voltage, and converting the received current into a charging current having a current value being K times a current value of the received current, where a conversion coefficient K is a constant value, and K is any real number greater than 1; and
charging, by the terminal, a battery according to the charging voltage and the charging current.

Optionally, the open-loop fast charging instruction includes a battery voltage value of the terminal, and the open-loop fast charging instruction is used to instruct the charger to output, according to the battery voltage value, a voltage and a current; and
adaptively, the performing, by the terminal, charging in the open-loop fast charging mode includes:
converting, by the terminal, the received voltage into a charging voltage having a voltage value being 1/K times the voltage value of the received voltage, and converting the received current into a charging current having a current value being K times a current value of the received current, where a conversion coefficient K is a constant value, and K is any real number greater than 1; and
charging, by the terminal, a battery according to the charging voltage and the charging current.

It may be understood that the charger may support two or more charging modes. Optionally, when the charging mode supported by the charger further includes the closed-loop fast charging mode, the method further includes: detecting a voltage of the battery in the terminal to obtain the battery voltage value; when the battery voltage value is greater than a first preset threshold, sending a closed-loop fast charging instruction to the charger; and receiving, by the terminal, a voltage and a current that are transmitted by the charger according to the closed-loop fast charging instruction, and performing charging in the closed-loop fast charging mode. It should be noted that when the battery voltage value is greater than the first preset threshold, the closed-loop fast charging mode may be used to perform refined charging according to real-time voltage feedback of the battery. It may be understood that before the performing charging in the closed-loop fast charging mode, the method further includes: switching, by the terminal, the charging mode from the open-loop fast charging mode to the closed-loop fast charging mode.

Optionally, when the charging mode supported by the charger further includes the closed-loop fast charging mode, the method further includes: detecting a voltage of the battery in the terminal to obtain the battery voltage value; when the battery voltage value is greater than a second preset threshold, sending a common charging instruction to the charger; and receiving, by the terminal, a voltage and a current that are transmitted by the charger according to the common charging instruction, and performing charging in the common fast charging mode.

With reference to the first aspect, it should be noted that the obtaining, by a terminal, a charging mode supported by a charger connected to the terminal includes: detecting, by the terminal, a voltage signal of a communication cable between the terminal and the charger, so as to determine the charging mode supported by the charger.

With reference to the first aspect, it should be noted that, before the obtaining, by a terminal, a charging mode supported by a charger connected to the terminal, the method further includes: sending, by the terminal, a request message to the charger connected to the terminal, where the request message is used to obtain the charging mode supported by the charger; and the obtaining, by a terminal, a charging mode supported by a charger connected to the terminal includes:

receiving, by the terminal, a feedback message sent by the charger, where the feedback message includes the charging mode supported by the charger.

A second aspect of the present application provides another charging method, where the method includes: when a charger detects that a connection is established to a terminal, performing, by the charger, a handshake with the terminal, so that the terminal determines that the charger supports an open-loop fast charging mode; receiving, by the charger, instruction information sent by the terminal; and when the instruction information is used to instruct the charger to charge in the open-loop fast charging mode, outputting, by the charger, a voltage and a current according to the instruction information in the open-loop fast charging mode.

With reference to the second aspect, it should be noted that a method for implementing this step: the performing, by the charger, a handshake with the terminal, so that the terminal determines that the charger supports an open-loop fast charging mode, may be: setting, by the charger, a voltage signal of a communication cable, so that the terminal determines, according to the voltage signal, that the charger supports the open-loop fast charging mode. Optionally, a method for implementing this step may also be: receiving, by the charger, an inquiry request sent by the terminal, where the inquiry request is used to obtain a charging mode supported by the charger; and sending, by the charger, feedback information to the terminal, where the feedback information is used to indicate that the charger supports a fast charging mode.

With reference to the second aspect, it may be understood that the instruction information may include various information, and is specifically as follows:

Optionally, the instruction information includes a battery voltage value of the terminal; and the outputting, by the charger, a voltage and a current according to the instruction information in the open-loop fast charging mode includes:

adjusting, by the charger, the voltage to K times the battery voltage value, where K is a pre-stored fixed conversion ratio coefficient, and K is a constant value and is any real number greater than 1;

determining, by the charger, a current corresponding to the battery voltage value, where a correspondence between the battery voltage value and the current is pre-stored in the charger; and outputting, by the charger, a voltage of the K times the battery voltage value, and outputting the current corresponding to the battery voltage value.

Optionally, the instruction information includes a battery voltage value of the terminal and a target voltage value of the terminal; and the outputting, by the charger, a voltage and a current according to the instruction information in the open-loop fast charging mode includes:

adjusting, by the charger, the voltage to the target voltage value;

determining, by the charger, a current value corresponding to the battery voltage value, where a correspondence between the battery voltage value and the current is pre-stored in the charger; and outputting, by the charger, a voltage of the target voltage value, and outputting the current corresponding to the battery voltage value.

Optionally, the instruction information includes the target voltage value and a target current value; and the outputting, by the charger, a voltage and a current according to the instruction information in the open-loop fast charging mode includes:

adjusting, by the charger, the voltage to the target voltage value;

adjusting, by the charger, the current to the target current value; and outputting, by the charger, a voltage of the target voltage value and a current of the target current value.

A third aspect of the present application provides a terminal, where the terminal includes: an obtaining unit, configured to obtain a charging mode supported by a charger connected to the terminal; a detection unit, configured to: when the charging mode supported by the charger includes an open-loop fast charging mode, detect, by the terminal, whether both the terminal and the charger are in an open loop state; a sending unit, configured to: when both the charger and the terminal are in the open loop state, send, by the terminal, an open-loop fast charging instruction to the charger; a receiving unit, configured to receive a voltage and a current that are transmitted by the charger according to the open-loop fast charging instruction; and a charging unit, configured to perform charging in the open-loop fast charging mode.

With reference to the third aspect, it may be understood that the open-loop fast charging instruction may include a plurality of groups of parameters, and is specifically as follows:

Optionally, the open-loop fast charging instruction includes a battery voltage value of the terminal and a target voltage value of the terminal, and the open-loop fast charging instruction is used to instruct the charger to output a voltage of the target voltage value and output a current according to the battery voltage value;

the charging unit is configured to: convert the received voltage into a charging voltage having a voltage value being 1/K times the voltage value of the received voltage, and convert the received current into a charging current having a current value being K times a current value of the received current, where a conversion coefficient K is a constant value, and K is any real number greater than 1; and the charging unit is further configured to charge a battery according to the charging voltage and the charging current.

Optionally, the open-loop fast charging instruction includes a target voltage value and a target current value, and the open-loop fast charging instruction is used to instruct the charger to output a voltage of the target voltage value and a current of the target current value; the charging unit is configured to: convert the received voltage into a charging voltage having a voltage value being 1/K times the voltage value of the received voltage, and convert the received current into a charging current having a current value being K times a current value of the received current, where a conversion coefficient K is a constant value, and K is any real number greater than 1; and the charging unit is further configured to charge a battery according to the charging voltage and the charging current.

Optionally, the open-loop fast charging instruction includes a battery voltage value of the terminal, the open-loop fast charging instruction is used to instruct the charger to output, according to the battery voltage value, a voltage and a current; the charging unit is configured to: convert the received voltage into a charging voltage having a voltage value being 1/K times the voltage value of the received voltage, and convert the received current into a charging current having a current value being K times a current value of the received current, where a conversion coefficient K is a constant value, and K is any real number greater than 1; and the charging unit is further configured to charge a battery according to the charging voltage and the charging current.

With reference to the third aspect, it should be noted that the detection unit is further configured to: when the charging mode supported by the charger further includes the closed-loop fast charging mode, detect a voltage of the battery in the terminal to obtain the battery voltage value; the sending unit is configured to: when the battery voltage value is greater than a first preset threshold, send a closed-loop fast charging instruction to the charger; the receiving unit is further configured to receive a voltage and a current that are transmitted by the charger according to the closed-loop fast charging instruction; and the charging unit is configured to perform charging in the closed-loop fast charging mode.

Optionally, the terminal further includes a switching unit, where the switching unit is configured to switch the charging mode from the open-loop fast charging mode to the closed-loop fast charging mode; and the charging unit is configured to perform charging in the closed-loop fast charging mode.

With reference to the third aspect, it should be noted that the detection unit is further configured to: when the charging mode supported by the charger further includes the common charging mode, detect a voltage of the battery in the terminal to obtain the battery voltage value; the sending unit is configured to: when the battery voltage value is greater than a second preset threshold, send a common charging instruction to the charger; the receiving unit is configured to receive a voltage and a current that are transmitted by the charger according to the common charging instruction; and the charging unit is configured to perform charging in the common fast charging mode.

Optionally, the terminal further includes a switching unit, where the switching unit is configured to switch the charging mode from the open-loop fast charging mode to the common charging mode; and the charging unit is configured to perform charging in the common charging mode.

With reference to the third aspect, it should be noted that the obtaining unit is configured to detect a voltage signal of a communication cable between the terminal and the charger, so as to determine the charging mode supported by the charger.

With reference to the third aspect, it may be understood that the sending unit is configured to send a request message to a charger connected to the terminal, where the request message is used to obtain the charging mode supported by the charger; and the obtaining unit is configured to receive a feedback message sent by the charger, where the feedback message includes the charging mode supported by the charger.

A fourth aspect of the present application provides a charger, where the charger includes: a handshake unit, configured to: when a charger detects that a connection is established to a terminal, perform a handshake with the terminal, so that the terminal determines that the charger supports an open-loop fast charging mode; a receiving unit, configured to receive instruction information sent by the terminal; and an output unit, configured to: when the instruction information is used to instruct the charger to charge in the open-loop fast charging mode, output, by the charger, a voltage and a current according to the instruction information in the open-loop fast charging mode.

With reference to the fourth aspect, it should be noted that the handshake unit is further configured to set a voltage signal of a communication cable, so that the terminal determines, according to the voltage signal, that the charger supports the open-loop fast charging mode.

With reference to the fourth aspect, it may be understood that the receiving unit is further configured to receive an inquiry request sent by the terminal, where the inquiry request is used to obtain a charging mode supported by the charger; and the handshake unit is further configured to send feedback information to the terminal, where the feedback information is used to indicate that the charger supports a fast charging mode.

With reference to the fourth aspect, it should be noted that the instruction information may include a plurality of groups of parameters, and is specifically as follows:

Optionally, the instruction information includes a battery voltage value of the terminal;

the output unit is configured to: adjust the voltage to K times the battery voltage value, and output a voltage of the K times the battery voltage value, where K is a pre-stored fixed conversion ratio coefficient, and K is a constant value and is any real number greater than 1; and the output unit is further configured to: determine a current corresponding to the battery voltage value, and output the current corresponding to the battery voltage value, where a correspondence between the battery voltage value and the current is pre-stored in the charger.

Optionally, the instruction information includes a battery voltage value of the terminal and a target voltage value of the terminal;

the output unit is configured to: adjust the voltage to the target voltage value, and output a voltage of the target voltage value; and the output unit is further configured to: determine a current value corresponding to the battery voltage value, and output the current corresponding to the battery voltage value, where a correspondence between the battery voltage value and the current is pre-stored in the charger.

Optionally, the instruction information includes the target voltage value and a target current value;

the output unit is configured to: adjust the voltage to the target voltage value, and output a voltage of the target voltage value; and the charger adjusts the output current to the target current value, and outputs a current of the target current value.

A fifth aspect of the present application provides a charging system, where the charging system includes a connection cable, the terminal according to the third aspect, and the charger according to the fourth aspect, where the terminal is connected to the charger by using the connection cable.

A sixth aspect of the present application provides another charging method, and the charger may identify a charging mode supported by a terminal. When the terminal supports an open-loop fast charging mode, the charger instructs the terminal to adjust to an open loop state, and the charger obtains a charging parameter of the terminal, adjusts a voltage and a current according to the charging parameter, and outputs an adjusted voltage and an adjusted current. The charging parameter may be a battery voltage value, or may be a battery voltage value and a target current value, or may be a target voltage value and a target current value.

Optionally, the charger obtains the charging mode supported by the terminal connected to the charger. When the charging mode supported by the terminal includes the open-loop fast charging mode, the charger detects whether both the terminal and the charger are in the open loop state. When the terminal is in the open loop state, the charger obtains a target voltage and a target current of the terminal. The charger outputs the target voltage and the target current, so that the terminal performs charging in the open-loop fast charging mode.

A seventh aspect of the present application provides a terminal, where the terminal includes a first detection circuit, a second detection circuit, a sending circuit, a receiver circuit, and a charging circuit.

The first detection circuit is configured to detect a voltage signal of a communication cable between the terminal and a charger, so as to determine a charging mode supported by the charger.

It should be noted that the terminal may further obtain, by means of interaction, the charging mode supported by the charger. For example, the sending circuit sends a request message to the charger connected to the terminal, where the request message is used to obtain the charging mode supported by the charger. The receiving circuit is configured to receive a feedback message sent by the charger, where the feedback message includes the charging mode supported by the charger.

The second detection circuit is configured to: when the charging mode supported by the charger includes an open-loop fast charging mode, detect, by the terminal, whether both the terminal and the charger are in an open loop state.

The sending circuit is configured to: when both the charger and the terminal are in the open loop state, send, by the terminal, an open-loop fast charging instruction to the charger.

The receiving circuit is configured to receive a voltage and a current that are transmitted by the charger according to the open-loop fast charging instruction.

The charging circuit is configured to perform charging in the open-loop fast charging mode.

It should be noted that the charging circuit is specifically configured to: convert the received voltage into a charging voltage having a voltage value being $1/K$ times the voltage value of the received voltage, and convert the received current into a charging current having a current value being $K$ times a current value of the received current, where a conversion coefficient $K$ is a constant value, $K$ is any real number greater than 1; and the charging circuit is further configured to charge a battery according to the charging voltage and the charging current.

Optionally, the terminal further includes a third detection unit and a switching circuit, where when the charging mode supported by the charger further includes the closed-loop fast charging mode, the third detection unit is configured to detect a voltage of the battery in the terminal to obtain a battery voltage value; the sending circuit is configured to: when the battery voltage value is greater than a first preset threshold, send a closed-loop fast charging instruction to the charger; the receiving circuit is configured to receive a voltage and a current that are transmitted by the charger according to the closed-loop fast charging instruction; the switching circuit is configured to switch the charging mode from the open-loop fast charging mode to the closed-loop fast charging mode; and the charging circuit is configured to perform charging in the closed-loop fast charging mode.

It should be noted that, when the charging mode supported by the charger further includes the common charging mode, a method for switching the open-loop fast charging mode to the common charging mode is the same as a method for switching the open-loop fast charging mode to the closed-loop charging mode, and details are not repeatedly described herein.

A eighth aspect of the present application provides a charger, where the charger includes: a voltage setting circuit, a receiving circuit, and an output circuit. The voltage setting circuit is configured to set a voltage signal of a communication cable, so that the terminal determines, according to the voltage signal, that the charger supports the open-loop fast charging mode; the receiving circuit is configured to receive instruction information sent by a terminal 10; and the output circuit is configured to: when the instruction information is used to instruct a charger 20 to charge in the open-loop fast charging mode, output a voltage and a current according to the instruction information in the open-loop fast charging mode.

Optionally, the charger may further notify, by means of interaction, the terminal of the charging mode supported by the charger. For example, the charger further includes a sending circuit. The receiving circuit is configured to receive an inquiry request sent by the terminal, where the inquiry request is used to obtain a charging mode supported by the charger; and when the receiving unit receives the inquiry request, the sending circuit sends feedback information to the terminal, where the feedback information is used to indicate that the charger supports a fast charging mode.

It can be learned from the foregoing that the technical solutions of the present application provide the charging method, the terminal, the charger, and the system. In the technical solutions provided in the present application, the terminal obtains the charging mode supported by the charger connected to the terminal. When the charging mode supported by the charger includes the open-loop fast charging mode, the terminal detects whether both the terminal and the charger are in the open loop state. When the charger is in the open loop state, the terminal sends the open-loop fast charging instruction to the charger. The terminal receives the voltage and the current that are transmitted by the charger according to the open-loop fast charging instruction, and performs charging in the open-loop fast charging mode. By implementing the technical solutions provided in the present application, when determining that the charger supports charging in the open-loop fast charging mode, the terminal is adjusted to the open-loop fast charging mode to perform charging, so as to shorten a charging time and improve user experience.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

As a terminal continues to become strong, people are increasingly dependent on the terminal, and even do not leave the terminal for a moment. People can perform communication, have entertainment, work, and do the like by using the terminal. Therefore, the terminal plays an important role in daily life. A subsequent problem is that a large quantity of applications are running for a long time at the same time, resulting in relatively fast power consumption of the terminal, and a large capacity and high density of a battery configured in the terminal cause a relatively low charging speed, and severely affect a user's use, so as to reduce user experience.

The present application provides a fast charging system, and the fast charging system can implement fast charging. For a specific schematic diagram of the fast charging system, refer to FIG. 1. The system includes a terminal 10, a charger 20, and a connection cable 30, where the terminal 10 is connected to the charger 20 by using the connection cable 30.

Figure 2:
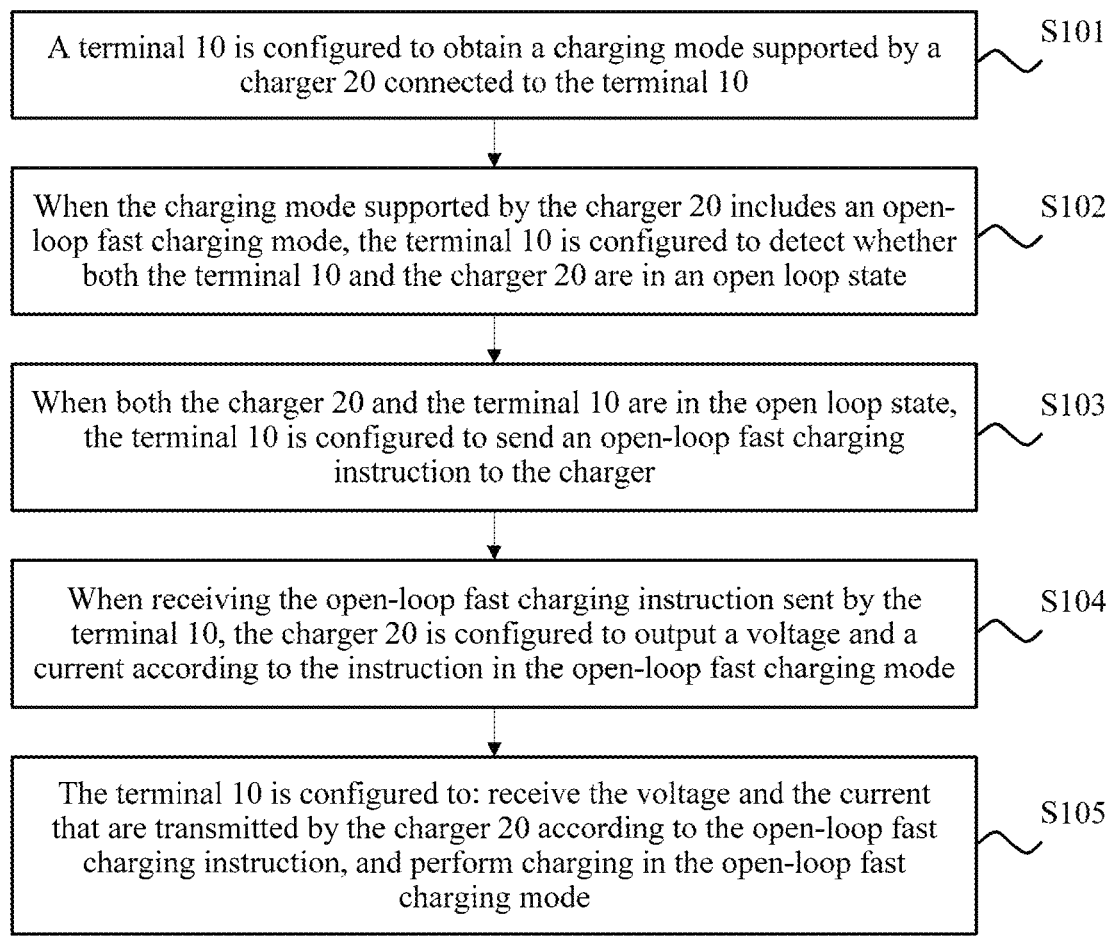
FIG. 2 is a flowchart of a charging method according to an embodiment of the present application.

It should be noted that, as shown in FIG. 2, the system performs the fast charging by using the following procedure.

S101. A terminal 10 is configured to obtain a charging mode supported by a charger 20 connected to the terminal 10.

The terminal 10 may be an electronic device such as a mobile phone, a tablet computer, an intelligent wearable device, and a computer.

A battery in the terminal is usually a lithium-ion battery, and a type of the battery is not limited herein.

The terminal 10 may detect a voltage signal of a communication cable between the terminal 10 and the charger 20, so as to determine the charging mode supported by the charger.

Optionally, in addition to a connection cable between the terminal 10 and the charger 20, there may further be separate communication cables (two cables: D+ and D−). For example, different types of chargers generally provide a parameter such as a charging type by applying different voltages to D+ and D−, and the terminal 10 detects the voltage signal of the communication cable to determine the charging mode supported by the charger 20. As shown in the following table, when detecting that D+ is 0.6 V and D− is 0 V, the terminal considers that a charger supports a common charging mode. When detecting that D+ is 3.3 V and D− is 0.6 V, the terminal considers that a charger supports 9 V 2 A charging. When detecting that D+ is 0.6 V and D− is 3.3 V, the terminal considers that a charger supports open-loop fast charging.

| D+ | D− | Output voltage | Maximum output current |
|-----|-----|----------------|------------------------|
| 0.6 V | 0 V | 5 V | 1 A |
| 0.6 V | 0.6 V | 12 V | 1.5 A |
| 3.3 V | 0.6 V | 9 V | 2 A |
| 0.6 V | 3.3 V | Open-loop charging mode | 9 A |

It should be noted that the terminal 10 may further obtain, by means of interaction, the charging mode supported by the charger 20, and the means of interaction may be wireless communications (both the terminal and the charger have a wireless communications module, for example, Wireless Fidelity Wi-Fi, Bluetooth, and Zigbee). For example, a specific interaction process may be as follows: The terminal 10 sends a request message to the charger 20 connected to the terminal 10, where the request message is used to obtain the charging mode supported by the charger 20; and the terminal 10 receives a feedback message sent by the charger 20, where the feedback message includes the charging mode supported by the charger 20.

It may be understood that the connection cable between the terminal 10 and the charger 20 integrates a communication function, and may transfer information between the terminal 10 and the charger 20.

S102. When the charging mode supported by the charger 20 includes an open-loop fast charging mode, the terminal 10 is configured to detect whether both the terminal 10 and the charger 20 are in an open loop state.

It may be understood that the terminal 10 may include a plurality of charging modes, for example, the open-loop charging mode, a closed-loop charging mode, or the common charging mode. Therefore, there is a need to detect whether the terminal 10 is in the open loop state, and this specifically indicates whether a DC/DC (DC/DC) conversion module in the terminal 10 works in the open loop state. It should be noted that the DC/DC module converts a current transmitted by the charger into a current that charges the battery.

It should be noted that the open-loop charging mode means that the terminal performs charging in a DC/DC conversion manner with a fixed conversion ratio, that is, the DC/DC module uses a fixed duty cycle to work, and continuously adjusts an output voltage and an output current of the charger based on real-time voltage feedback of the battery. Conversion efficiency of the DC/DC conversion manner is higher, so that a charging current that is output to the battery on a mobile phone side can be larger, and charging efficiency of the entire fast charging system is effectively improved, thereby effectively shortening a charging time.

It should be noted that the closed-loop charging mode means that the terminal performs charging in a DC/DC conversion manner with an pre-determined conversion ratio.

Likewise, the charger 20 may support one charging mode, or may include the plurality of charging modes, for example, the open-loop charging mode, the closed-loop charging mode, or the common charging mode. Therefore, there is a need to detect whether the charger 20 is in the open loop state. When the charger 20 is in the open loop state, the charger 20 may send information to the terminal 10 for notification, so that the terminal 10 determines that the charger 20 is in the open loop state.

Optionally, when the charging mode supported by the charger 20 includes the open-loop fast charging mode, the terminal 10 detects whether the DC/DC module of the terminal works in the open loop state. If the DC/DC module does not work in the open loop state, the DC/DC module is adjusted to work in the open loop state, so as to perform charging in the open loop mode.

Optionally, when the charging mode supported by the charger 20 includes the open-loop fast charging mode and the closed-loop fast charging mode, the DC/DC module of the terminal may be first adjusted to the open loop state, so as to perform charging in the open-loop fast charging mode. When a battery voltage in the terminal reaches a first preset threshold, the DC/DC module of the terminal is adjusted to a closed loop state, so as to perform charging in the closed-loop fast charging mode.

S103. When both the charger 20 and the terminal 10 are in the open loop state, the terminal 10 is configured to send an open-loop fast charging instruction to the charger.

It should be noted that the open-loop fast charging instruction may enable, by transmitting a plurality of parameters, the charger 20 to perform charging.

For example, the open-loop fast charging instruction includes a battery voltage value and a target voltage value of the terminal 10, and is used to instruct the charger 20 to output a voltage of the target voltage value and output a current according to the battery voltage value.

For another example, the open-loop fast charging instruction includes a target voltage value and a target current value, and is used to instruct the charger 20 to output a voltage of the target voltage value and a current of the target current value.

For another example, the open-loop fast charging instruction includes a battery voltage value of the terminal 10, and is used to instruct the charger to output a voltage and a current according to the battery voltage value.

S104. When receiving the open-loop fast charging instruction sent by the terminal 10, the charger 20 is configured to output a voltage and a current according to the instruction in the open-loop fast charging mode.

It should be noted that when the instruction information includes the battery voltage value of the terminal 10, the charger 20 adjusts the voltage to K times the battery voltage value, where K is a pre-stored fixed conversion ratio coefficient, and K is a constant value and is any real number greater than 1; the charger 20 determines a current corresponding to the battery voltage value, where a correspondence between the battery voltage value and the current is pre-stored in the charger 20; and the charger 20 outputs a voltage of the K times the battery voltage value, and outputs the current corresponding to the battery voltage value.

It may be understood that when the instruction information includes the battery voltage value and the target voltage value of the terminal, the charger 20 adjusts the voltage to the target voltage value; the charger 20 determines a current value corresponding to the battery voltage value, where a correspondence between the battery voltage value and the current is pre-stored in the charger; and the charger 20 outputs a voltage of the target voltage value, and outputs the current corresponding to the battery voltage value.

Optionally, when the instruction information includes the target voltage value and the target current value, the charger adjusts the voltage to the target voltage value; the charger adjusts the current to the target current value; and the charger outputs a voltage of the target voltage value and a current of the target current value.

S105. The terminal 10 is configured to: receive the voltage and the current that are transmitted by the charger 20 according to the open-loop fast charging instruction, and perform charging in the open-loop fast charging mode.

It should be noted that the performing, by the terminal, charging in the open-loop fast charging mode includes:

converting, by the terminal 10, the received voltage into a charging voltage having a voltage value being 1/K times the voltage value of the received voltage, and converting the received current into a charging current having a current value being K times a current value of the received current, where a conversion coefficient K is a constant value, and K is any real number greater than 1; and charging, by the terminal 10, the battery according to the charging voltage and the charging current. It may be understood that K and 1/K are theoretical values obtained according to conservation of energy. However, a heat loss exists in a charging process, that is, the charging, by the terminal 10, the battery according to the charging voltage and the charging current may be understood as follows: The terminal 10 charges the battery according to a charging voltage close to the charging voltage (for example, 95% to 99% of the charging voltage) and a charging current close to the charging current (for example, 95% to 99% of the charging current).

It may be understood that, when the terminal in the fast charging system provided in this embodiment of the present application determines that the charger supports the open-loop fast charging mode, fast charging can be performed for the terminal in the open-loop fast charging mode, thereby improving user experience.

Figure 1:
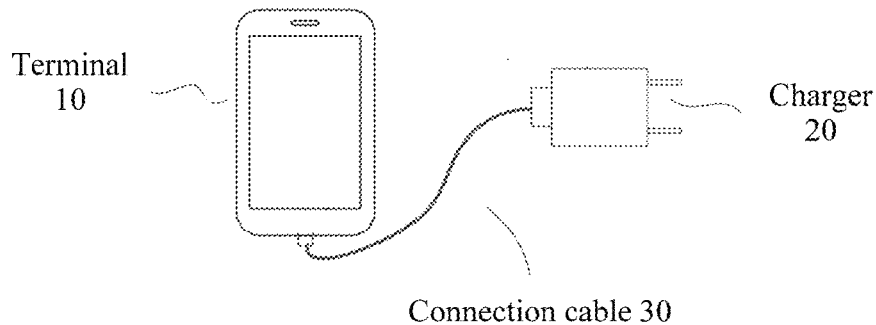
FIG. 1 is a schematic diagram of a fast charging system according to an embodiment of the present application.
Figure 3:
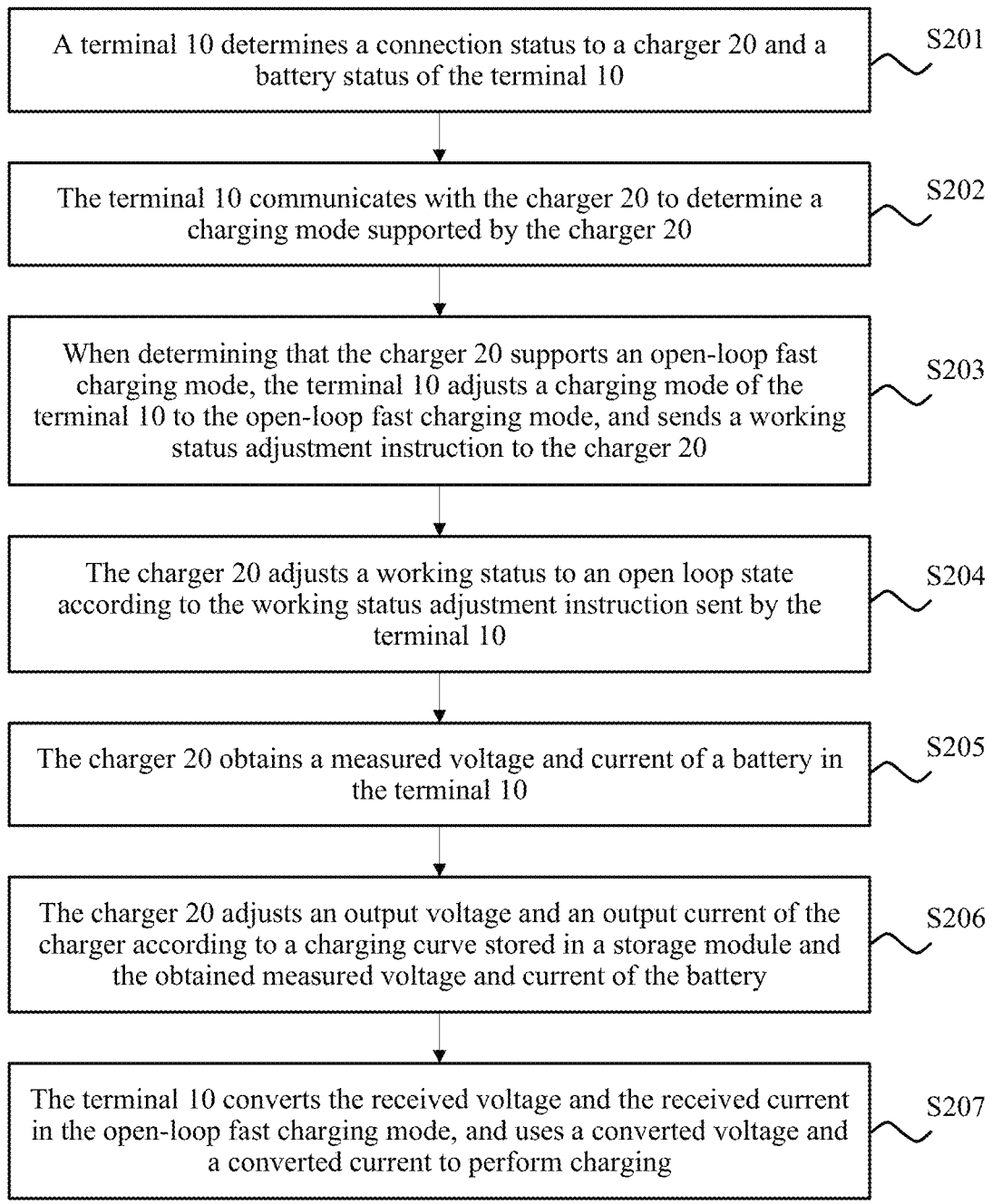
FIG. 3 is a flowchart of another charging method according to an embodiment of the present application.

As shown in FIG. 3, in another embodiment of the present application, a specific charging method is provided, and the method may be applied to the fast charging system described in FIG. 1. The method includes the following steps.

S201. A terminal 10 determines a connection status to a charger 20 and a battery status of the terminal 10.

The connection status may be understood that whether a connection can be powered on, and whether communication can be performed, and the like. For the battery status, there is usually a need to determine whether a battery is well connected to the terminal, a state of charge of the battery, a health status of the battery, and the like.

S202. The terminal 10 communicates with the charger 20 to determine a charging mode supported by the charger 20.

It should be noted that the terminal may actively send information to the charger for inquiry, or may enable the charger to actively report the charging mode supported by the charger.

S203. When determining that the charger 20 supports an open-loop fast charging mode, the terminal 10 adjusts a charging mode of the terminal 10 to the open-loop fast charging mode, and sends a working status adjustment instruction to the charger 20.

It should be noted that, if the terminal 10 is in the open-loop fast charging mode, no adjustment is required.

S204. The charger 20 adjusts a working status to an open loop state according to the working status adjustment instruction sent by the terminal 10.

It should be noted that, if the charger 20 is in the open-loop state, no adjustment is required.

S205. The charger 20 obtains a measured voltage and current of a battery in the terminal 10.

S206. The charger 20 adjusts an output voltage and an output current of the charger according to a charging curve stored in a storage module and the obtained measured voltage and current of the battery.

S207. The terminal 10 converts the received voltage and the received current in the open-loop fast charging mode, and uses a converted voltage and a converted current to perform charging.

Optionally, when the charger 20 does not support the open-loop fast charging mode, the charger outputs a preset voltage value, so that the terminal 10 performs charging according to the preset voltage value.

It may be understood that when it is detected that a voltage of the battery in the terminal 10 reaches a preset threshold, the charger 20 and the terminal 10 disconnect an electrical connection to stop charging. For example, if the battery is fully charged with a voltage of 4.5 V, when it is detected that a battery voltage reaches 4.49 V or 4.48 V, charging may be stopped. The foregoing number is not limited, and is not enumerated one by one.

Figure 4:
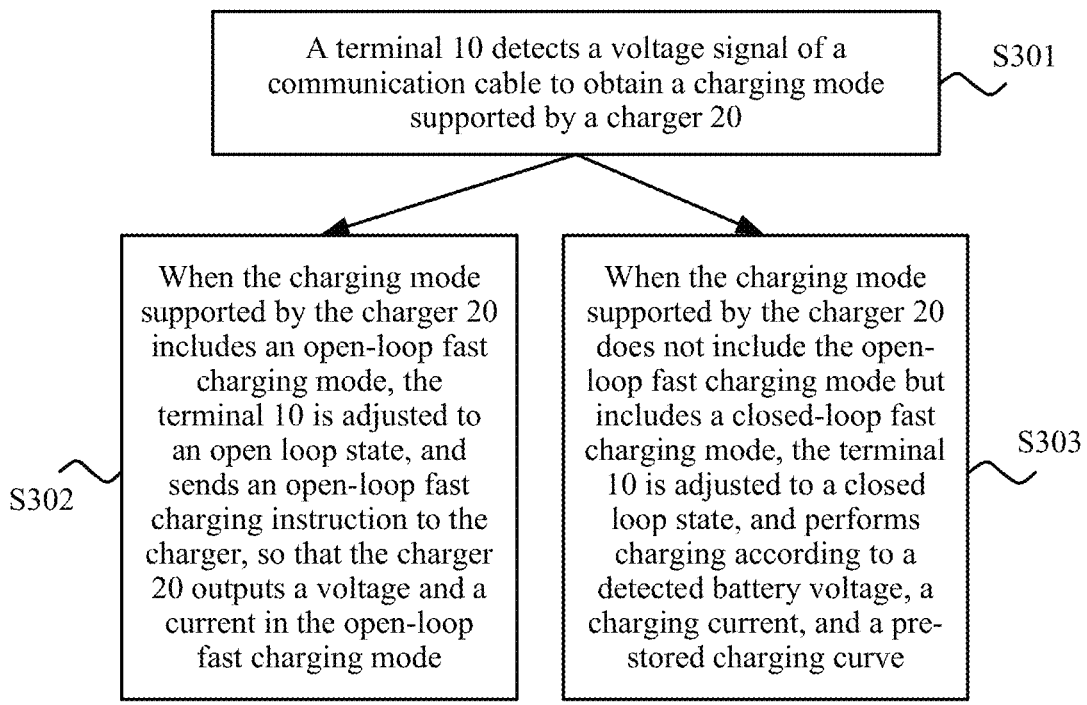
FIG. 4 is a flowchart of another charging method according to an embodiment of the present application.

As shown in FIG. 4, in another embodiment of the present application, a specific charging method is provided, and the method may be applied to the fast charging system described in FIG. 1. The method includes the following steps.

S301. A terminal 10 detects a voltage signal of a communication cable to obtain a charging mode supported by a charger 20. It should be noted that the communication cable connects the terminal 10 and the charger 20.

S302. When the charging mode supported by the charger 20 includes an open-loop fast charging mode, the terminal 10 is adjusted to an open loop state, and sends an open-loop fast charging instruction to the charger, so that the charger 20 outputs a voltage and a current in the open-loop fast charging mode.

It should be noted that when the terminal is in the open loop state, the terminal works according to a preset fixed maximum duty cycle (which, for example, may be a maximum duty cycle, thereby improving charging efficiency), depends on a charger side to adjust an output voltage and implement fast charging, and can perform charging with a relatively large charging current, so as to shorten a charging time.

In addition, it should be further noted that when charging is performed in the open-loop fast charging mode, the fast charging system performs fast charging in a high voltage and low current manner, and a relatively small charging current in a connection cable and a charging circuit reduces a requirement for the connection cable, and also reduces heat of a charging system.

S303. When the charging mode supported by the charger 20 does not include the open-loop fast charging mode but includes a closed-loop fast charging mode, the terminal 10 is adjusted to a closed loop state, and performs charging according to a detected battery voltage, a charging current, and a pre-stored charging curve.

It should be noted that when the terminal is in the closed loop state, charging can be implemented by using a standard such as 9 V 2 A or 5 V 1.8 A, and is compatible with another charging protocol.

It should be noted that when a battery voltage value of the terminal 10 reaches a third preset threshold (the third preset threshold is close to a voltage value of a battery in a fully charged state, for example, may be 99% of the voltage value of the battery in the fully charged state), the charger 20 is notified to stop charging.

It can be learned from the foregoing that the fast charging system provided in the present application is compatible with different input voltages and different chargers, and uses different control policies for different input voltages or chargers. When the charger can perform fast charging, the fast charging system uses an open-loop control manner, uses a fixed duty cycle to work, and continuously adjusts the output voltage and the output current of the charger based on real-time voltage feedback of the battery. When the charger cannot perform fast charging, the fast charging system uses a closed-loop control manner, and continuously adjusts the output voltage and the output current of the charger based on real-time voltage feedback of the battery.

Figure 5:
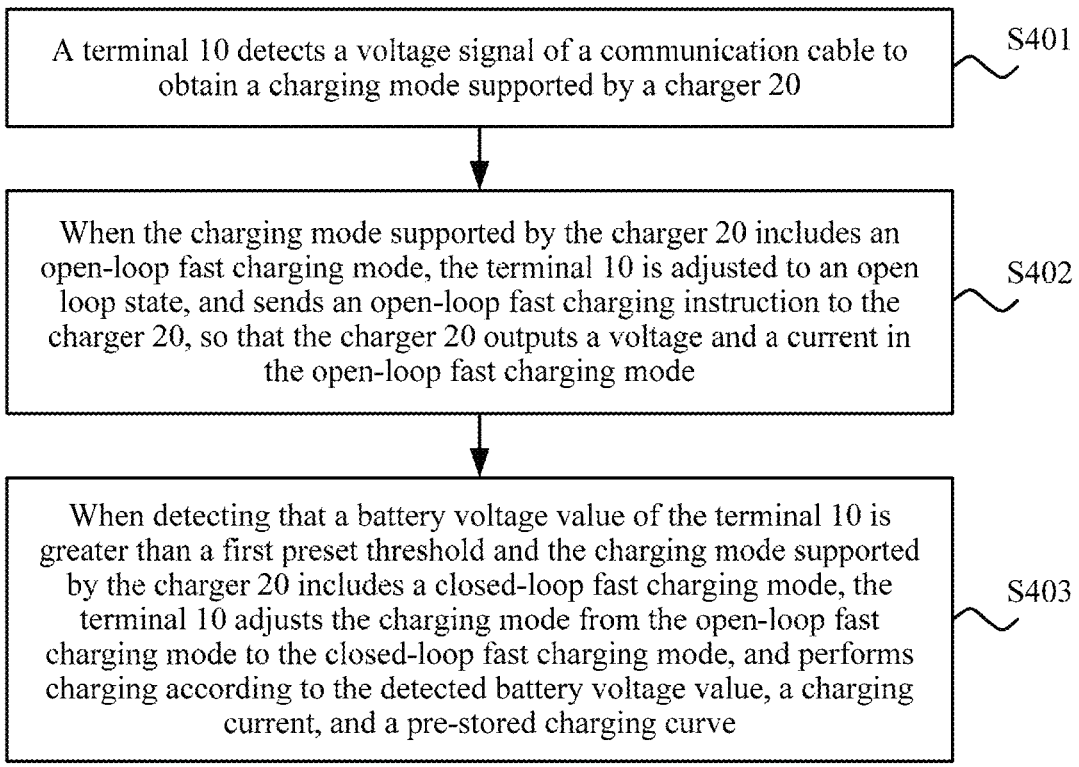
FIG. 5 is a flowchart of another charging method according to an embodiment of the present application.

As shown in FIG. 5, in another embodiment of the present application, a specific charging method is provided, and the method may be applied to the fast charging system described in FIG. 1. The method includes the following steps.

S instruction information. A terminal 10 detects a voltage signal of a communication cable to obtain a charging mode supported by a charger 20. It should be noted that the communication cable connects the terminal 10 and the charger 20.

S402. When the charging mode supported by the charger 20 includes an open-loop fast charging mode, the terminal 10 is adjusted to an open loop state, and sends an open-loop fast charging instruction to the charger 20, so that the charger 20 outputs a voltage and a current in the open-loop fast charging mode.

S403. When detecting that a battery voltage value of the terminal 10 is greater than a first preset threshold and the charging mode supported by the charger 20 includes a closed-loop fast charging mode, the terminal 10 adjusts the charging mode from the open-loop fast charging mode to the closed-loop fast charging mode, and performs charging according to the detected battery voltage value, a charging current, and a pre-stored charging curve.

It should be noted that when the battery voltage value of the terminal 10 reaches a third preset threshold (the third preset threshold is close to a voltage value of a battery in a fully charged state, for example, may be 99% of the voltage value of the battery in the fully charged state), the charger 20 is notified to stop charging.

Figure 6:
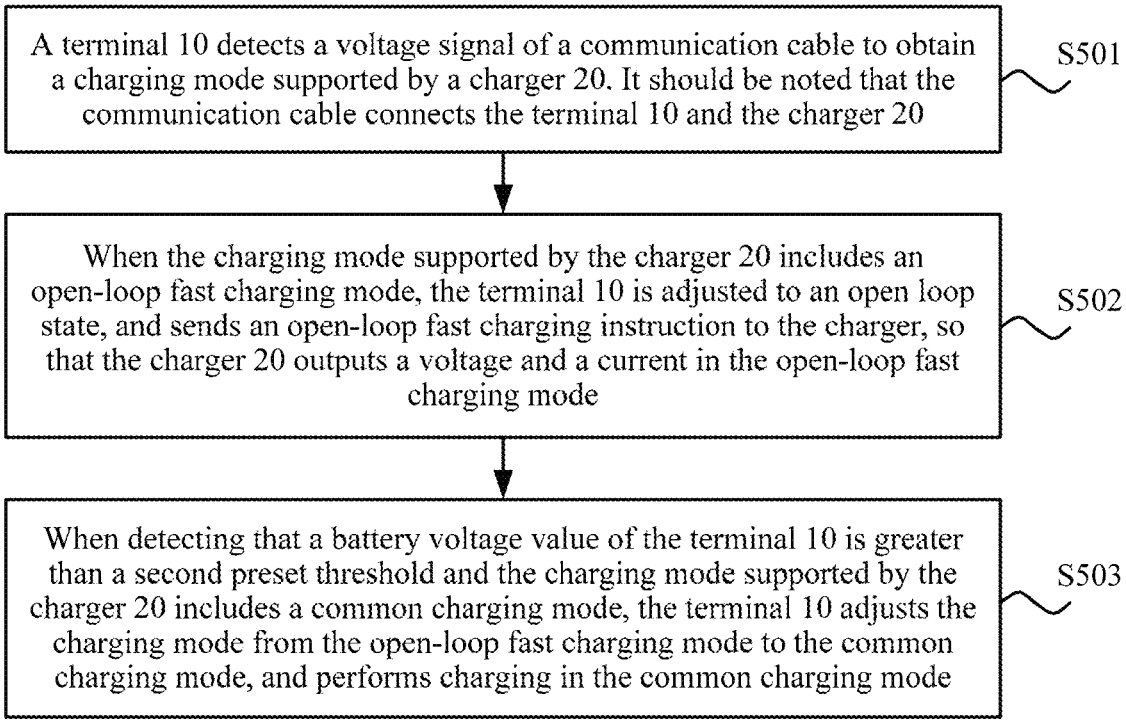
FIG. 6 is a flowchart of another charging method according to an embodiment of the present application.

As shown in FIG. 6, in another embodiment of the present application, a specific charging method is provided, and the method may be applied to the fast charging system described in FIG. 1. The method includes the following steps.

S501. A terminal 10 detects a voltage signal of a communication cable to obtain a charging mode supported by a charger 20. It should be noted that the communication cable connects the terminal 10 and the charger 20.

S502. When the charging mode supported by the charger 20 includes an open-loop fast charging mode, the terminal 10 is adjusted to an open loop state, and sends an open-loop fast charging instruction to the charger, so that the charger 20 outputs a voltage and a current in the open-loop fast charging mode.

S503. When detecting that a battery voltage value of the terminal 10 is greater than a second preset threshold and the charging mode supported by the charger 20 includes a common charging mode, the terminal 10 adjusts the charging mode from the open-loop fast charging mode to the common charging mode, and performs charging in the common charging mode.

It should be noted that the common charging mode may be another mode other than the open-loop fast charging mode and a closed-loop fast charging mode.

A first preset threshold and the second preset threshold may be the same, or may be different.

For example, in the common charging mode, the charger may provide 5 V/0.5 A, 9 V/1 A, or the like, and this is not enumerated one by one herein.

It should be noted that when the battery voltage value of the terminal 10 reaches a third preset threshold (the third preset threshold is close to a voltage value of a battery in a fully charges state, for example, may be 99% of the voltage value of the battery in the fully charged state), the charger 20 is notified to stop charging.

Figure 7:
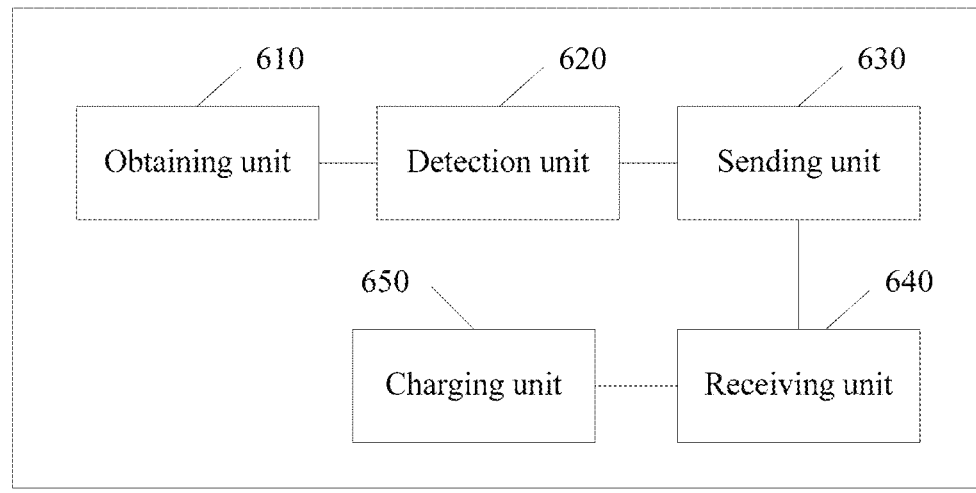
FIG. 7 is a schematic structural diagram of a terminal according to another embodiment of the present application.

The following describes in detail a terminal 10 in a fast charging system (as shown in FIG. 1) according to an embodiment of the present application with reference to FIG. 7. The terminal 10 includes an obtaining unit 610, a detection unit 620, a sending unit 630, a receiving unit 640, and a charging unit 650.

The obtaining unit 610 is configured to obtain a charging mode supported by a charger connected to the terminal 10.

It should be noted that the obtaining unit 610 may determine, by detecting a voltage signal of a communication cable between the terminal and the charger, the charging mode supported by the charger.

Optionally, the terminal 10 may obtain, by means of interaction, the charging mode supported by the charger. For example, the sending unit 630 sends a request message to the charger connected to the terminal, where the request message is used to obtain the charging mode supported by the charger. The obtaining unit 610 is configured to receive a feedback message sent by the charger, where the feedback message includes the charging mode supported by the charger.

The detection unit 620 is configured to: when the charging mode supported by the charger 20 includes an open-loop fast charging mode, detect, by the terminal, whether both the terminal and the charger are in an open loop state.

The sending unit 630 is configured to: when both the charger 20 and the terminal 10 are in the open loop state, send, by the terminal, an open-loop fast charging instruction to the charger.

It should be noted that the open-loop fast charging instruction may include different parameters to instruct the charger 20 to transmit a voltage and a current. For example, the open-loop fast charging instruction includes a battery voltage value and a target voltage value of the terminal, and the open-loop fast charging instruction is used to instruct the charger to output a voltage of the target voltage value and output a current according to the battery voltage value.

For another example, the open-loop fast charging instruction includes a target voltage value and a target current value, and the open-loop fast charging instruction is used to instruct the charger to output a voltage of the target voltage value and a current of the target current value.

Figure 8:
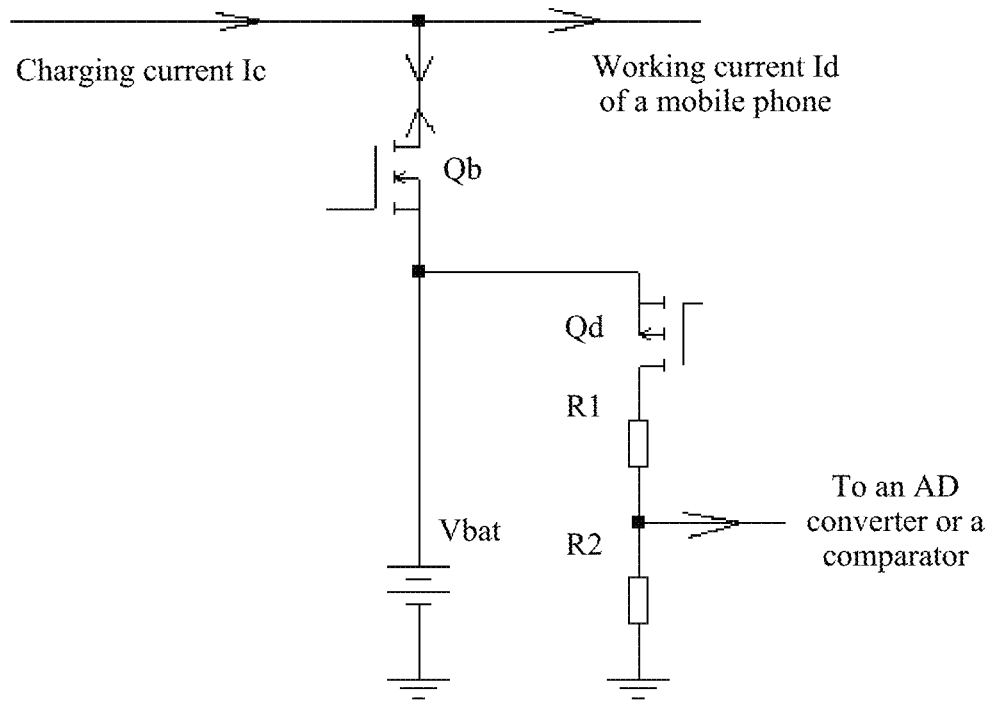
FIG. 8 is a structural diagram of a detection circuit of a terminal according to an embodiment of the present application.

For another example, the open-loop fast charging instruction includes a battery voltage value of the terminal, and is used to instruct the charger to output a voltage and a current according to the battery voltage value. It should be noted that the battery voltage value may be detected by using a detection circuit. As shown in FIG. 8, in a specific detection circuit for detecting a battery voltage of a terminal (mobile phone), a switch Qb is connected in series to a battery. During charging, the switch Qb is connected. When the battery voltage is detected, the switch Qb is disconnected. Both a charging current and a discharging current are 0, so that a voltage drop of a cable and a voltage drop of internal resistance drop to the minimum, and at the same time, a Qd is connected. The battery voltage is divided by R1 and R2 and sent to a back-end analog-to-digital converter or a comparator, to obtain the battery voltage value.

The receiving unit 640 is configured to receive the voltage and the current that are transmitted by the charger 20 according to the open-loop fast charging instruction, and in a specific implementation, the receiving unit 640 may receive, by using a receiving circuit, the output voltage and the output current that are transmitted by the charger.

The charging unit 650 is configured to perform charging in the open-loop fast charging mode.

It should be noted that the charging unit 650 is specifically configured to: convert the received voltage into a voltage having a voltage value being 1/K times the voltage value of the received voltage, and convert the received current into a current having a current value being K times a current value of the received current, where a conversion coefficient K is a constant value, and K is any real number greater than 1; and the charging unit 650 is further configured to charge the battery according to the charging voltage and the charging current.

It should be noted that optionally, the charging unit 650 includes a conversion circuit and a charging circuit. The conversion circuit is configured to convert the received voltage into the 1/K times output voltage, and convert the received output current into the K times output current. The charging circuit performs charging in the open-loop fast charging mode. Optionally, the conversion circuit is a Buck circuit or a switched capacitor conversion circuit.

Figure 9:
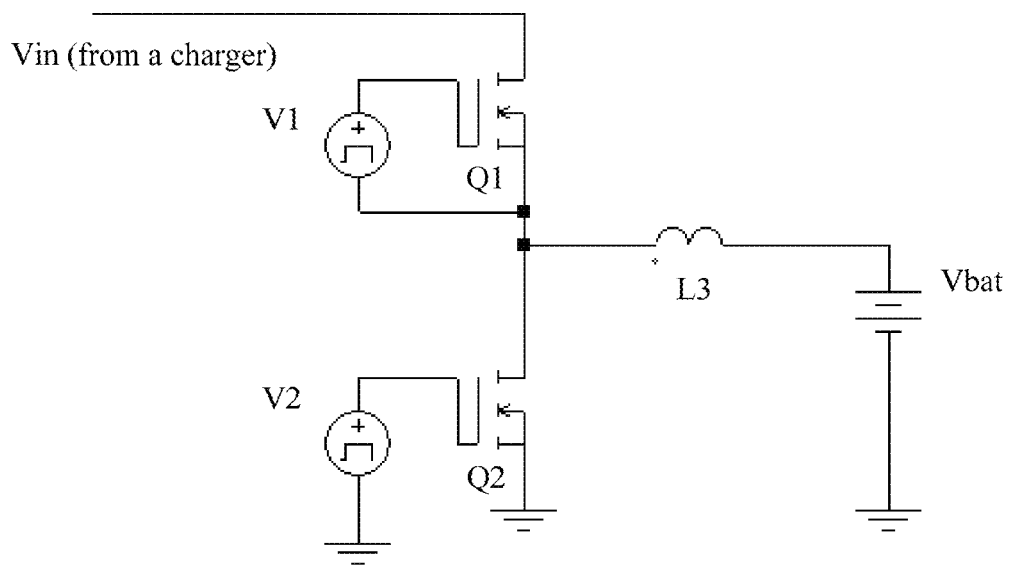
FIG. 9 is a Buck circuit diagram according to an embodiment of the present application.

For example, as shown in FIG. 9, the conversion circuit uses a buck manner with a fixed duty cycle. In a buck with a fixed duty cycle, switching transistors Q1 and Q2 form a bridge arm. Drive signals V1 and V2 drive Q1 and Q2 to be alternately connected, so as to convert a direct current voltage Vin into a pulse voltage with a fixed duty cycle, and implement a voltage drop with K times conversion coefficient. A direct current voltage Vout is output after filtering performed by an inductor L3, and Vout=Vin/K. A duty cycle is fixed to a maximum value, and charging can be efficiently performed. In addition, in the buck manner with a fixed duty cycle, a plurality of bucks may be connected in parallel according to a phase sequence to form a multiphase buck.

Figure 10:
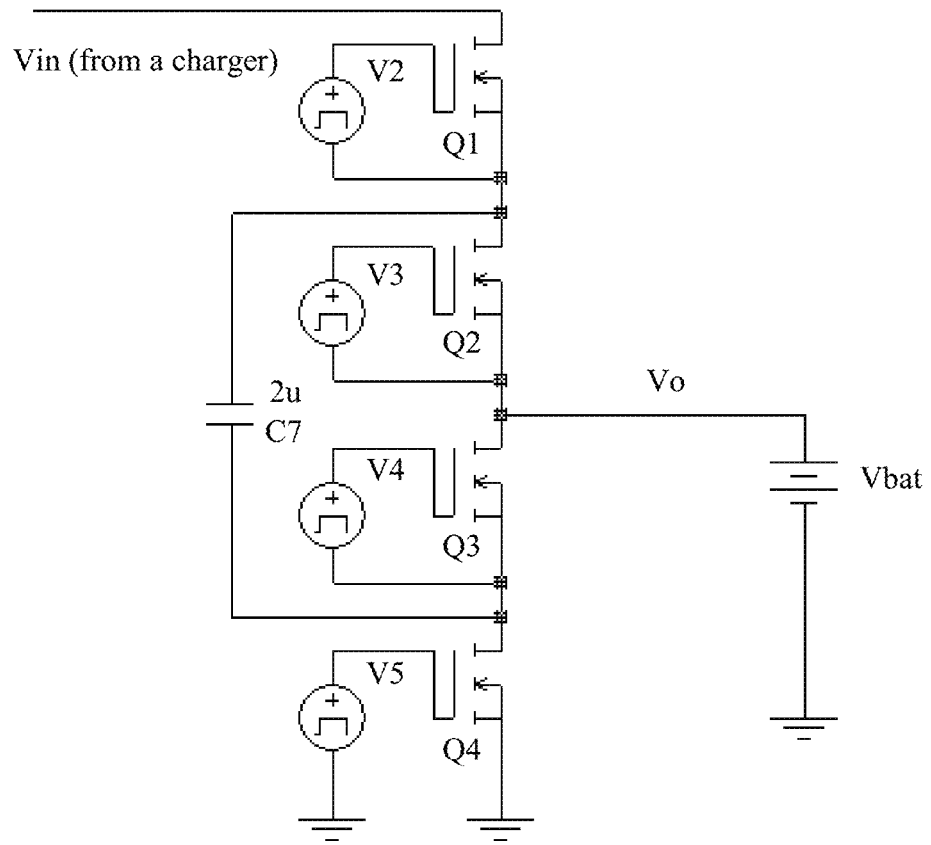
FIG. 10 is a circuit diagram of a switched capacitor converter according to another embodiment of the present application.

For example, as shown in FIG. 10, a DC/DC conversion module may further use a switched capacitor converter. Four switching transistors are connected in series in the switched capacitor converter. A capacitor C7 is connected between a midpoint of Q1 and Q2 and a midpoint of Q3 and Q4. V2 to V5 are drivers of the switching transistors. V2 and V5 are complementary, and V3 and V4 are complementary. A 2:1 switched capacitor converter may drop an input voltage to half of the input voltage at a fixed ratio of 2:1. After Vin is converted by the conversion circuit, a voltage Vout≈Vin/2 is output. Switched capacitor conversion requires no inductor, and a loss can be greatly reduced. Therefore, conversion efficiency can be greatly improved, and a larger charging current can be implemented.

Optionally, it should be noted that the terminal further includes a switching unit 660.

The detection unit 620 is further configured to: when the charging mode supported by the charger further includes a closed-loop fast charging mode, detect a voltage of the battery in the terminal to obtain the battery voltage value.

The sending unit 630 is configured to: when the battery voltage value is greater than a first preset threshold, send a closed-loop fast charging instruction to the charger.

The receiving unit 640 is further configured to receive a voltage and a current that are transmitted by the charger according to the closed-loop fast charging instruction.

The switching unit 660 is configured to switch the charging mode from the open-loop fast charging mode to the closed-loop fast charging mode.

The charging unit 650 is configured to perform charging in the closed-loop fast charging mode.

Optionally, it should be noted that the detection unit 620 is further configured to: when the charging mode supported by the charger further includes the common charging mode, detect a voltage of the battery in the terminal to obtain the battery voltage value.

The sending unit 630 is configured to: when the battery voltage value is greater than a second preset threshold, send a common charging instruction to the charger.

The receiving unit 640 is configured to receive a voltage and a current that are transmitted by the charger according to the common charging instruction.

The charging unit 650 is configured to perform charging in the common fast charging mode.

It can be learned from the foregoing that the terminal provided in the present application identifies the charging mode supported by the charger. When the charger can support open-loop fast charging, the terminal switches to the open loop state, uses the fixed duty cycle to work, and continuously adjusts the output voltage and the output current of the charger based on real-time voltage feedback of the battery, so as to shorten a charging time and achieve an objective of fast charging.

Figure 11:
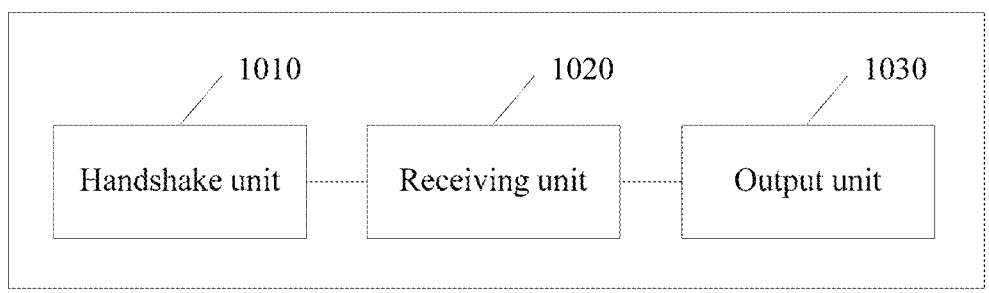
FIG. 11 is a schematic structural diagram of a charger according to an embodiment of the present application.

As shown in FIG. 11, a charger 20 in the fast charging system includes a handshake unit 1010, a receiving unit 1020, and an output unit 1030.

The handshake unit 1010 is configured to: when the charger 20 detects that a connection is established to a terminal 10, perform a handshake with the terminal 10, so that the terminal 10 determines that the charger 20 supports an open-loop fast charging mode.

It should be noted that the handshake unit 1010 may set a voltage signal of a communication cable, so that the terminal determines, according to the voltage signal, that the charger supports the open-loop fast charging mode.

In addition, the charger may notify, by means of interaction, the terminal 10 of the charging mode supported by the charger 20. For example, the receiving unit 1020 receives an inquiry request sent by the terminal, where the inquiry request is used to obtain the charging mode supported by the charger. The handshake unit 1010 sends, when the receiving unit receives the inquiry request, feedback information to the terminal, where the feedback information is used to indicate that the charger supports a fast charging mode.

The receiving unit 1020 is configured to receive instruction information sent by the terminal 10.

The output unit 1030 is configured to: when the instruction information is used to instruct the charger 20 to charge in the open-loop fast charging mode, output a voltage and a current according to the instruction information in the open-loop fast charging mode.

It may be understood that the instruction information may instruct, in different manners, the charger 20 to adjust the voltage and an output circuit.

For example, the instruction information includes a battery voltage value of the terminal, and the output unit 1030 includes an adjustment circuit and a transmission circuit.

The adjustment circuit is configured to adjust the voltage to K times the battery voltage value.

The output circuit is configured to output a voltage of the K times the battery voltage value, where K is a pre-stored fixed conversion ratio coefficient, and K is a constant value and is any real number greater than 1.

The adjustment circuit is further configured to determine a current corresponding to the battery voltage value.

The output circuit is further configured to output the current corresponding to the battery voltage value, where a correspondence between the battery voltage value and the current is pre-stored in the charger.

For another example, the instruction information includes a battery voltage value and a target voltage value of the terminal.

The adjustment circuit is configured to adjust the voltage to the target voltage value.

The output circuit is configured to output a voltage of the target voltage value.

The adjustment circuit is further configured to determine a current value corresponding to the battery voltage value.

The output circuit is further configured to output the current corresponding to the battery voltage value, where a correspondence between the battery voltage value and the current is pre-stored in the charger.

For another example, the instruction information includes the target voltage value and a target current value.

The adjustment circuit is configured to adjust the voltage to the target voltage value. The output circuit is configured to output a voltage of the target voltage value.

The adjustment circuit is further configured to adjust the output current to the target current value. The output circuit is further configured to output a current of the target current value.

Figure 12:
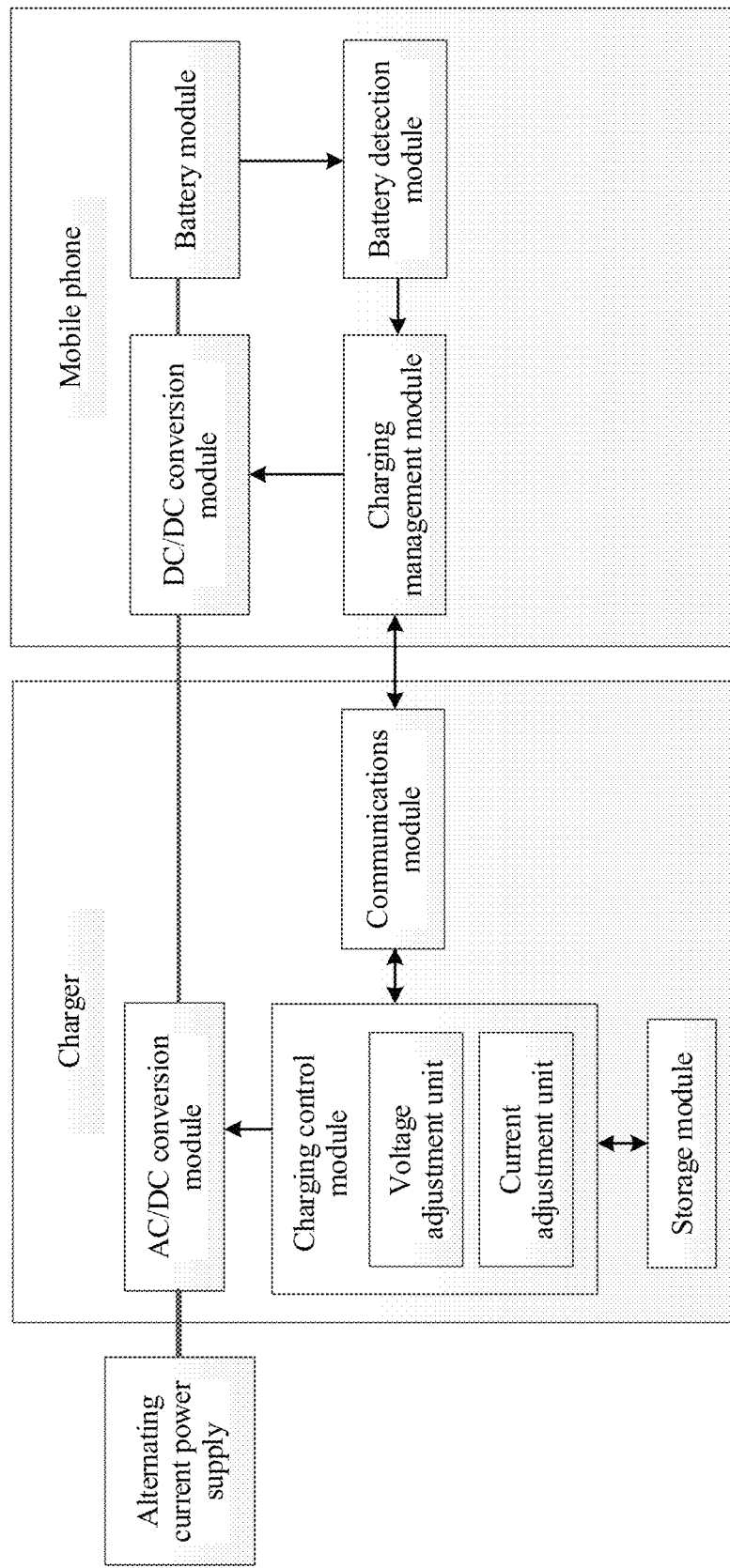
FIG. 12 is a schematic diagram of a fast charging system according to another embodiment of the present application.

As shown in FIG. 12, an embodiment of the present application provides another fast charging system. The fast charging system includes a charger and a terminal (a mobile phone is used as an example). It should be noted that the charger has a function of outputting a fixed direct current voltage, or has a function of adjusting an output voltage or an output current according to a battery voltage of the terminal or a state of charge of a battery.

The charger includes an AC/DC conversion module, a charging control module, a communications module, and a storage module.

The AC/DC conversion module is configured to convert, into a direct current, an alternating current provided by an alternating current power supply.

It should be noted that, if the charger is connected to a direct current power supply, the charger may also include a DC/DC conversion module.

The communications module is configured to interact with the terminal, so that the terminal determines that the charger supports an open-loop fast charging mode; or the communications module is configured to interact with the terminal, so that the charger determines that the terminal supports an open-loop fast charging mode.

For example, the communications module may transmit charger or battery information, current and voltage information, temperature information, and a command. For example, a charging current amplitude is determined by using different voltage combinations on two cables D+ and D− of a USB: Voltages of D+ and D− may be classified into m levels, and m*m current values may be determined; or transmission is performed by using a digital signal, and so on.

The communications module is configured to: when receiving an open-loop fast charging command sent by the terminal, send an instruction to the charging control module.

The charging control module is configured to: adjust the output voltage according to the instruction sent by the communications module, and output the output current corresponding to the instruction. A correspondence between the instruction and the current is stored in the storage module.

The mobile phone includes a DC/DC conversion module, a battery module, a battery detection module, and a charging management module.

The DC/DC conversion module in the mobile phone may work in an open loop state, or may work in a closed loop state. The DC/DC conversion module in the mobile phone may be a switched capacitor converter, a critical mode soft switch Buck converter, or another converter, and this is not enumerated one by one herein.

It should be noted that when the DC/DC conversion module works in the open loop state, the DC/DC conversion module converts the received voltage and the received current according to a fixed conversion ratio.

Further, it should be noted that the DC/DC conversion module has at least two working modes, and may work in the closed loop state or the open loop state.

Specifically, the DC/DC conversion module works in a corresponding mode according to a working mode supported by the charger, and achieves a maximum charging current or an optimal efficiency effect.

Further, when it is detected that the charger supports open loop mode charging, the DC/DC conversion module of the mobile phone works in the open loop state. When the charger does not support the open loop mode charging, correspondingly, the DC/DC conversion module of the mobile phone works in the closed loop state.

Figure 13:
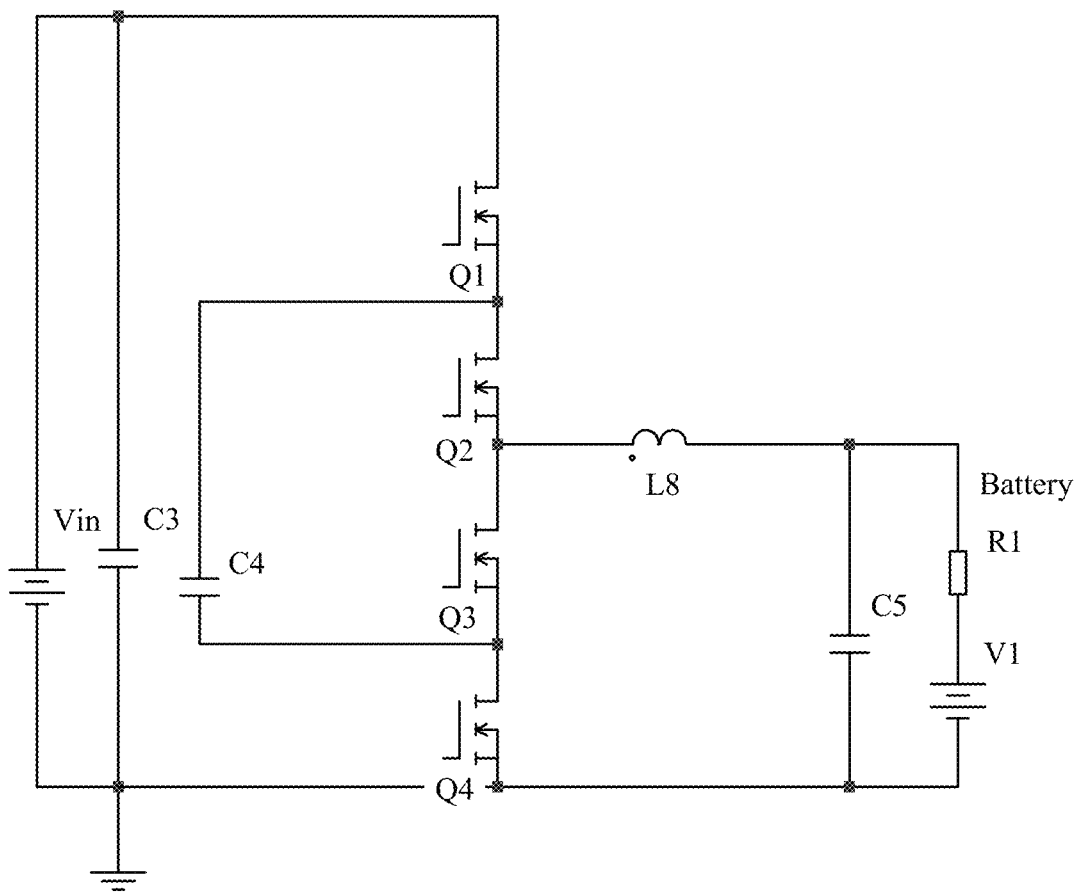
FIG. 13 is a structural diagram of a switched capacitor converter according to another embodiment of the present application.

As shown in FIG. 13, a switched capacitor converter is used as an example. When a mobile phone communicates with a charger and determines that the charger supports an open-loop fast charging mode, a switching transistor of the switched capacitor converter works in a fixed frequency and fixed duty cycle state. A phase difference between Q1 and Q4 is 180°, and a duty cycle is approximately 50% (there is a dead zone). A phase difference between Q2 and Q3 is 180°, a duty cycle is approximately 50% (there is a dead zone). A phase difference between Q1 and Q2 is 180°. In this case, a charging current and a charging voltage of a battery are controlled by the charger by adjusting an output voltage.

When the mobile phone communicates with the charger and determines that the charger does not support the open-loop fast charging mode, the converter works in the closed loop state, and there may be two specific control manners.

(A) Q1 and Q4 are directly connected.

A circuit is simplified as a buck circuit. Drive signals of Q2 and Q3 are complementary, and there is the dead zone.

The charging voltage and the charging current are controlled by adjusting the duty cycle.

(B) Q1 and Q4 are complementary, and Q2 and Q3 are complementary.

The phase difference between Q1 and Q2 is 180°, and the charging voltage and the charging current are controlled by adjusting the duty cycle. When the converter works in the closed loop state, the charging management module of the mobile phone has a preset value of the charging current and a preset value of the charging voltage, and the DC/DC conversion module adjusts the charging voltage and the charging current according to the preset values, to complete a charging process.

The battery detection module is configured to detect a battery voltage. It may be understood that when the battery detection module detects the battery voltage, charging may be stopped or the charging current may be reduced, to ensure detection precision.

The battery detection module may further obtain a battery current, a state of charge of the battery, a health state, and the like.

The charging management module includes a communications module, a mode selection module, and a storage module, and the like, and is configured to interact with the charger, supply power to the mobile phone, and manage charging mode selection.

It should be noted that an entire charging process of the fast charging system includes pre-charging (a battery voltage is less than 3 V), fast charging (a battery voltage is greater than 3 V and less than 4.2 V), slow charging (a battery voltage is greater than 4.2 V and less than 4.5 V), and numbers in brackets are used for example description.

It should be further noted that a process, after the charging mode supported by the charger is determined and a charging mode supported by the terminal is determined, may be led by the charger, or may be led by the terminal.

For example, the charger inquires about, by sending information, the charging mode supported by the terminal. When the charging mode supported by the terminal includes the open-loop fast charging mode, the charger determines whether the charger also supports the open-loop fast charging mode. When the charger also supports the open-loop fast charging mode, the charger instructs the terminal to start open-loop fast charging.

On the contrary, the terminal may inquire about, by sending information, the charging mode supported by the charger. When the charging mode supported by the charger includes the open-loop fast charging mode, the terminal determines whether the terminal also supports the open-loop fast charging mode. When the terminal also supports the open-loop fast charging mode, the terminal instructs the charger to start open-loop fast charging.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for ease and brevity of description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A charging method, wherein the method comprises:
   obtaining, by a terminal, a charging mode supported by a charger connected to the terminal, wherein the terminal obtains the charging mode supported by the charger through wireless communication or wired communication between the terminal and the charger;
   when the charging mode supported by the charger comprises an open-loop fast charging mode, adjusting the terminal from a first charging mode to operate in the open-loop fast charging mode and determining, by the terminal, that both the terminal and the charger are in the open-loop fast charging mode;
   sending, by the terminal, an open-loop fast charging instruction to the charger instructing the charger to output an output voltage that has a voltage value being K times a voltage value of a battery in the terminal;
   receiving, by the terminal, the output voltage and an output current that are transmitted by the charger according to the open-loop fast charging instruction;
   converting, by the terminal, the output voltage transmitted by the charger into a charging voltage, wherein the charging voltage has a voltage value being 1/K times the voltage value of the output voltage transmitted by the charger, and converting, by the terminal, the output current transmitted by the charger into a charging current, wherein the charging current has a current value being K times a current value of the output current transmitted by the charger, wherein a conversion coefficient K is a constant value, and wherein K is any real number greater than 1; and
   charging, by the terminal, the battery according to the charging voltage and the charging current.

2. The method according to claim 1, wherein when the charging mode supported by the charger further comprises a closed-loop fast charging mode and a common charging mode, the method further comprises:
   detecting a voltage of the battery in the terminal to obtain a battery voltage value;
   when the battery voltage value is greater than a preset threshold, sending a common charging instruction to the charger;
   receiving, by the terminal, a voltage and a current that are transmitted by the charger according to the common charging instruction; and
   performing charging in the closed-loop fast charging mode.

3. The method according to claim 1, wherein obtaining, by the terminal, the charging mode supported by the charger connected to the terminal comprises:
   detecting, by the terminal, a voltage signal of a communication cable between the terminal and the charger to determine the charging mode supported by the charger.

4. The method according to claim 1, wherein before obtaining, by the terminal, the charging mode supported by the charger connected to the terminal, the method further comprises:
   sending, by the terminal, a request message to the charger connected to the terminal, wherein the request message is used to obtain the charging mode supported by the charger; and
   wherein obtaining, by the terminal, the charging mode supported by the charger connected to the terminal comprises:
   receiving, by the terminal, a feedback message sent by the charger, wherein the feedback message comprises the charging mode supported by the charger.

5. The method according to claim 1, wherein the terminal obtains the charging mode supported by the charger through wireless communication between the terminal and the charger.

6. The method according to claim 1, wherein the open-loop fast charging instruction comprises the output voltage and the output current.

7. The method according to claim 1, wherein when the charging mode supported by the charger further comprises a closed-loop fast charging mode, the method further comprises:
   detecting a voltage of the battery in the terminal to obtain a battery voltage value;
   when the battery voltage value is greater than a preset threshold, sending a closed-loop fast charging instruction to the charger;
   receiving, by the terminal, a voltage and a current that are transmitted by the charger according to the closed-loop fast charging instruction; and
   performing charging in the closed-loop fast charging mode.

8. The method according to claim 7, wherein before the performing charging in the closed-loop fast charging mode, the method further comprises:
   switching, by the terminal, the charging mode from the open-loop fast charging mode to the closed-loop fast charging mode.

9. A terminal, wherein the terminal comprises:
   a charging management module configured to:
      when both a charger and the terminal are in an open-loop fast charging mode, send an open-loop fast charging instruction to the charger for instructing the charger to output an output voltage that has a voltage value being K times a voltage value of a battery in the terminal, wherein the terminal obtains a charging mode supported by the charger through wireless communication or wired communication between the terminal and the charger, and wherein the terminal is adjusted from a first charging mode to operate in the open-loop fast charging mode; and
   a DC/DC conversion module configured to:
      convert the output voltage transmitted by the charger into a charging voltage, wherein the charging voltage has a voltage value being 1/K times the voltage value of the output voltage transmitted by the charger; and
      convert an output current transmitted by the charger into a charging current for charging the battery, wherein the charging current has a current value being K times a current value of the output current transmitted by the charger, wherein a conversion coefficient K is a constant value, and wherein K is any real number greater than 1.

10. The terminal according to claim 9, wherein when the charging mode supported by the charger further comprises a closed-loop fast charging mode and a common charging mode, the charging management module is further configured to:
   detect a voltage of the battery in the terminal to obtain a battery voltage value;
   when the battery voltage value is greater than a preset threshold, send a common charging instruction to the charger;
   receive a voltage and a current that are transmitted by the charger according to the common charging instruction; and
   perform charging in the closed-loop fast charging mode.

11. The terminal according to claim 9, wherein the terminal detects a voltage signal of a communication cable between the terminal and the charger to obtain the charging mode supported by the charger.

12. The terminal according to claim 9, wherein before the charging management module sends the open-loop fast charging instruction to the charger, the charging management module is further configured to:
   send a request message to the charger, wherein the request message is used to obtain the charging mode supported by the charger; and
   receive a feedback message sent by the charger, wherein the feedback message comprises the charging mode supported by the charger.

13. The terminal according to claim 9, wherein the terminal obtains the charging mode supported by the charger through wireless communication between the terminal and the charger.

14. The terminal according to claim 9, wherein the open-loop fast charging instruction comprises the output voltage and the output current.

15. The terminal according to claim 9, wherein when the charging mode supported by the charger further comprises a closed-loop fast charging mode, the charging management module is further configured to:
   detect a voltage of the battery in the terminal to obtain a battery voltage value;
   when the battery voltage value is greater than a preset threshold, send a closed-loop fast charging instruction to the charger;
   receive a voltage and a current that are transmitted by the charger according to the closed-loop fast charging instruction; and
   perform charging in the closed-loop fast charging mode.

16. The terminal according to claim 15, wherein before the charging management module performs charging in the closed-loop fast charging mode, the charging management module is further configured to:
   switch the charging mode from the open-loop fast charging mode to the closed-loop fast charging mode.

17. A non-transitory computer readable storage medium comprising instructions which, when executed by a terminal, cause the terminal to perform operations comprising:
   obtaining a charging mode supported by a charger connected to the terminal, wherein the terminal obtains the charging mode supported by the charger through wireless communication or wired communication between the terminal and the charger;
   when the charging mode supported by the charger comprises an open-loop fast charging mode, adjusting the terminal from a first charging mode to operate in the open-loop fast charging mode and determining, by the terminal, that both the terminal and the charger are in the open-loop fast charging mode;
   sending an open-loop fast charging instruction to the charger instructing the charger to output an output voltage that has a voltage value being K times a voltage value of a battery in the terminal;
   receiving the output voltage and an output current that are transmitted by the charger according to the open-loop fast charging instruction;
   converting the output voltage transmitted by the charger into a charging voltage, wherein the charging voltage has a voltage value being 1/K times the voltage value of the output voltage transmitted by the charger, and converting, by the terminal, the output current transmitted by the charger into a charging current, wherein the charging current has a current value being K times a current value of the output current transmitted by the charger, wherein a conversion coefficient K is a constant value, and wherein K is any real number greater than 1; and
   charging the battery according to the charging voltage and the charging current.

18. The non-transitory computer readable storage medium according to claim 17, wherein the terminal detects a voltage signal of a communication cable between the terminal and the charger to obtain the charging mode supported by the charger.

19. The non-transitory computer readable storage medium according to claim 17, wherein the terminal obtains the charging mode supported by the charger through wireless communication between the terminal and the charger.

20. The non-transitory computer readable storage medium according to claim 17, wherein the open-loop fast charging instruction comprises the output voltage and the output current.

* * * * *